US006783480B2

(12) United States Patent
Masuda et al.

(10) Patent No.: US 6,783,480 B2
(45) Date of Patent: Aug. 31, 2004

(54) CONTROL DEVICE FOR AUTOMATIC TRANSMISSION

(75) Inventors: Manami Masuda, Tokyo (JP); Shingo Nakano, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/183,604

(22) Filed: Jun. 28, 2002

(65) Prior Publication Data

US 2003/0004033 A1 Jan. 2, 2003

(30) Foreign Application Priority Data

Jun. 29, 2001 (JP) ........................................ 2001-199374

(51) Int. Cl.[7] .............................................. F16H 59/10
(52) U.S. Cl. ........................ 477/94; 477/99; 192/220.2
(58) Field of Search .................. 477/94, 99; 192/220.2, 192/220.3, 220.4, 220.7; 74/473.18

(56) References Cited

U.S. PATENT DOCUMENTS 5,791,197 A * 8/1998 Rempinski et al. ...... 74/473.18
6,192,770 B1 * 2/2001 Miyoshi et al. .......... 74/473.18
6,325,196 B1 * 12/2001 Beattie et al. ........... 192/220.4
6,332,524 B1 * 12/2001 Shin ........................ 192/220.2

FOREIGN PATENT DOCUMENTS

JP     8-285057 A  * 11/1996
JP     8-334167       12/1996

* cited by examiner

Primary Examiner—Sherry Estremsky
(74) Attorney, Agent, or Firm—Smith, Gambrell & Russell, LLP

(57) ABSTRACT

An automatic transmission control device having a specific shift lock system for prohibiting a selective operation of a select lever rotataby supported on a first rotary shaft which is supported on a housing and extended in a widthwise direction of a vehicle body. The shift lock system has a lock pin extending substantially in parallel with the first rotary shaft, a second rotary shaft supported on the housing and extended substantially in parallel with the first rotary shaft, and a lock member having a lock part. The lock pin is movable in a lengthwise direction of the vehicle body with response to a rotation of the select lever. The lock member is supported on the second rotary shaft so as to rotate around the second rotary shaft to have one of a lock position and an unlock position. In the lock position, the lock member restricts the selective operation of the select lever by bringing the lock part into contact with a periphery of the lock pin.

34 Claims, 18 Drawing Sheets

CONTROL DEVICE FOR AUTOMATIC TRANSMISSION

BACKGROUND OF THE INVENTION

1. Field of the Invention

The present invention relates to a control device for an automatic transmission for a vehicle, in particular, to the control device for the automatic transmission having a shift lock system which can securely avoid plural improper selective operations of a select lever by a single lock member.

2. Discussion of the Related Art

A conventional control device for an automatic transmission has a shift lock system which permits selective operations of a select lever from a parking position to other range positions only when a brake pedal is actuated for example, at starting time of an automobile. The shift lock system preferably avoids a selective operation from a neutral position to a reverse position while driving of the automobile.

The shift lock system in the transmission control device usually has each lock member used in each case to restrict the selective operations by putting each lock member into operation at each predetermined operating condition in order to restrict the selective operations in the above two cases.

However, operating two kinds of lock members at predetermined operation conditions requires many components to be used and leads to a complex shift lock system. Furthermore, assembly of the shift lock system needs considerable hours and costs.

JP-A-8334167 discloses the control device for the automatic transmission having the shift lock system in which a single lock member avoids both selective operations from a parking position to other range positions and a selective operation from a neutral position to a reverse position at predetermined operating conditions.

The control device, as schematically shown in FIG. 22, includes a select lever 205 rotatably supported on a housing 201 and a gate 202 as an opening having a step-like configuration, the latter of which contains range positions for an automatic mode including a series of a parking position, a parking release position, a reverse position, a reverse preparing position and a neutral position. This gate type transmission control system performing the selective operations of the select lever 205 by engaging the select lever 205 with any of the range positions of the gate 202, is provided with an engaging projection 206 on one side of the select lever 205 and a single lock member 210 rotatably supported on the housing 201 through a rotary shaft 209. The lock member 210 rotates around the rotary shaft 209 with the aid of an electric solenoid 212 to obtain either a working position (shown in solid lines) for avoiding the selective operation from the parking position to the parking release position and the selective operation from the neutral position to the reverse preparing position by contacting a head end surface of the engaging projection 206 or a nonworking position (shown in imaginary lines) for avoiding contact therewith at predetermined operational conditions.

According to the above mentioned transmission control device disclosed in JP-A-8334167, both the selective operations of the select lever 205 from the parking position to other range positions and the selective operation from the neutral position to the reverse position are effectively restricted by rotating the lock member 210 to have the working position. The above selective operations are permitted by rotating the lock member 210 to have the non-working position.

The lock member 210, however, has a substantial length and a large space for the shift lock system, because the single lock member 210 supported on the rotary shaft 209 has to be operated for avoiding both the selective operations from the parking position to the parking release position and from the neutral position to the reverse preparing position.

In the improper selective operations of the select lever 205 from the parking position to the parking release position and from the neutral position to the reverse preparing position, some stress from the lock member 210 to the engaging projection 206 acts on the contacting region of the lock member 210 in a direction substantially perpendicular to the extended direction of the lock member 210. Significant large stress hence acts on both the rotary shaft 209 for supporting the lock members 210 and the supporting region thereof in the housing 201. This large stress leads to frictional wear of the supporting region and consequently a short time durability of the transmission control device. Therefore, a corrective measure, for example, supporting the rotary shaft 209 on both sides of the housing 201, may be required.

Supporting the rotary shaft 209 on both sides of the housing 201 increases the amount of space occupied by the shift lock system and the size of the transmission control device itself, thus, the weight of the transmission control device and the cost of manufacture as well.

OBJECT AND SUMMARY OF THE INVENTION

It is therefore an object of the present invention to provide a control device for an automatic transmission having a shift lock system which securely prohibits plural improper selective operations of a select lever by a lock member.

It is other object of the present invention to provide the control device for the automatic transmission with a durable shift lock system.

It is further object of the present invention to provide the control device for the automatic transmission having the shift lock system of very small size, and which is very light in weight and a low cost to manufacture.

It is another object of the present invention to provide the control device for the automatic transmission having the shift lock system which consumes only a little amount of electric power.

The above objects are achieved by the automatic transmission control device for the vehicle comprising: a housing for including the transmission control device; a first rotary shaft supported on the housing and extended in a substantially widthwise direction of a vehicle body; a lock plate with a guide opening containing range positions for an automatic transition mode including a series of a parking position, a reverse position, a neutral position and a driving position; a select lever supported on the first rotary shaft and being rotatable for selecting one of the range positions; a guide pin supported on the select lever, an end of the guide pin for defining a selective operation of the select lever accepted in the guide opening so as to engage with any of the range positions; and a specific shift lock system for prohibiting the selective operation of the select lever.

The shift lock system in the transmission control device comprises a lock pin extending substantially in parallel with the first rotary shaft, the lock pin being movable in a lengthwise direction of the vehicle body with response to a rotation of the select lever; a second rotary shaft supported on the housing and extended substantially in parallel with the first rotary shaft; and a lock member having a lock part supported on the second rotary shaft so as to rotate around the second rotary shaft to have one of a lock position and an unlock position, the lock position for prohibiting the selective operation of the select lever by bringing the lock part into a contact with a periphery of the lock pin.

The above object are also achieved by the automatic transmission control device for the vehicle comprising: a housing for including the control device; a first rotary shaft supported on the housing and extended in a substantially widthwise direction of an vehicle body; a third rotary shaft extended substantially perpendicularly to a longitudinal direction of the first rotary shaft; a select lever being rotatable around both the first rotary shaft and the third rotary shaft for selecting one of range positions for an automatic transmission mode; a gate provided in the housing containing the range positions including a series of a parking position, a reverse position, a neutral position and a driving position for defining the selective operation of the select lever; and the above specific shift lock system for prohibiting the selective operation of the select lever.

The shift lock system according to the present invention is arranged such that the lock part of the lock member enters into a movement track of the lock pin and locks the lock pin by contacting the periphery when an improper selective operation of the select lever is attempted to be carry out, and such that the lock part moves away from the movement track of the lock pin and releases the lock pin by avoiding the contact when an selective operation is acceptable. According to the present invention, the improper selective operations are securely prohibited by the single lock member. Furthermore, rotating of the lock member on the second rotary shaft provides a small lock member, a compact shift lock system and a transmission control system of very small size which is very light in weight and inexpensive to manufacture.

In the improper selective operations of the select lever, some stress from the periphery of the lock pin to the engaging region of the lock part acts on both the rotary shaft part and a supporting region thereof in a direction substantially perpendicular to the longitudinal direction of the second rotary shaft. As a result, unbalanced stress on the second rotary shaft and the supporting region are significantly reduced. Therefore, the requirement to the stiffness and wear resistance of these parts decreases, and simple structures of the parts can be obtained.

According to the present invention, it is possible to prohibit plural selective operations, such as the selective operation from the parking position to the reverse position, from the neutral position to the reverse position, and from the reverse position to the other positions, by changing a shape of the lock part of the lock member.

Furthermore, it is possible to prohibit an improper selective operation in an advantageous condition by placing the lock pin on a lock pin bracket which moves around the first rotary shaft together with the select lever.

According to the present invention, the driving means can be easily structured by an electric solenoid for rotating the lock member from the lock position to the unlock position. The solenoid is preferably arranged to operate only when a brake pedal is actuated. In this manner, it is possible to decrease the amount of electric power consumed by the solenoid.

Further aspects of the present invention will be clearly understood from the claims, the drawings and the written descriptions.

BRIEF DESCRIPTION OF THE DRAWINGS

The present invention is explained in further detail below with the reference to the drawings, in which.

DETAILED DESCRIPTION OF THE INVENTION

The preferable embodiments of the present invention will be described with reference to the drawings.

(First Embodiment)

Referring to the first embodiment of the present invention shown in FIGS. 1–13, the embodiment is a control device for a dual mode transmission having both a normal automatic transmission (AT) mode, in which the transmission is controlled by the transmission control device of a straight line type, and a manual transmission (MT) mode, in which the transmission is controlled manually.

Figure 1:
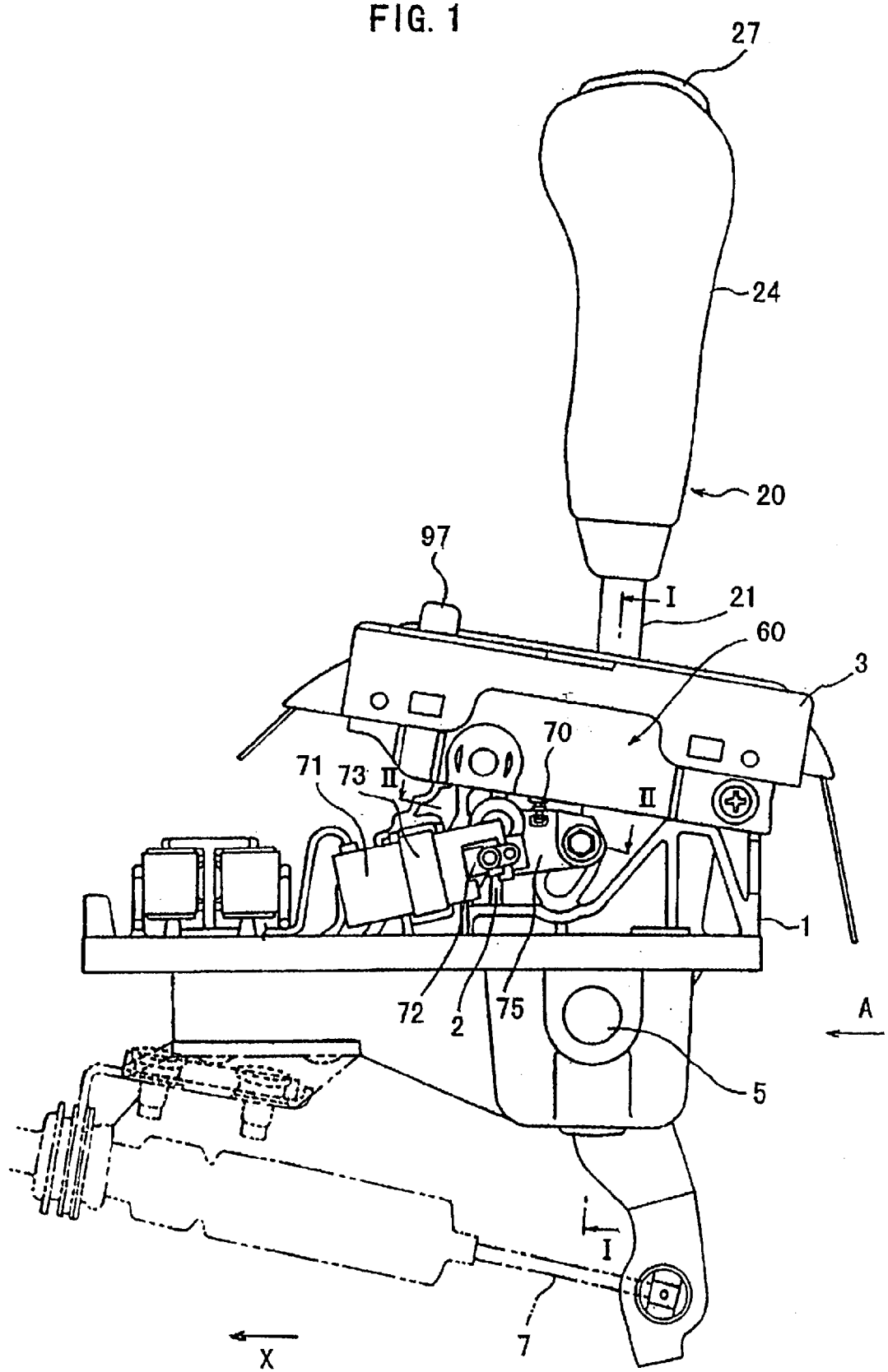
FIG. 1 is a schematic side view of a first embodiment of the present invention.
Figure 2:
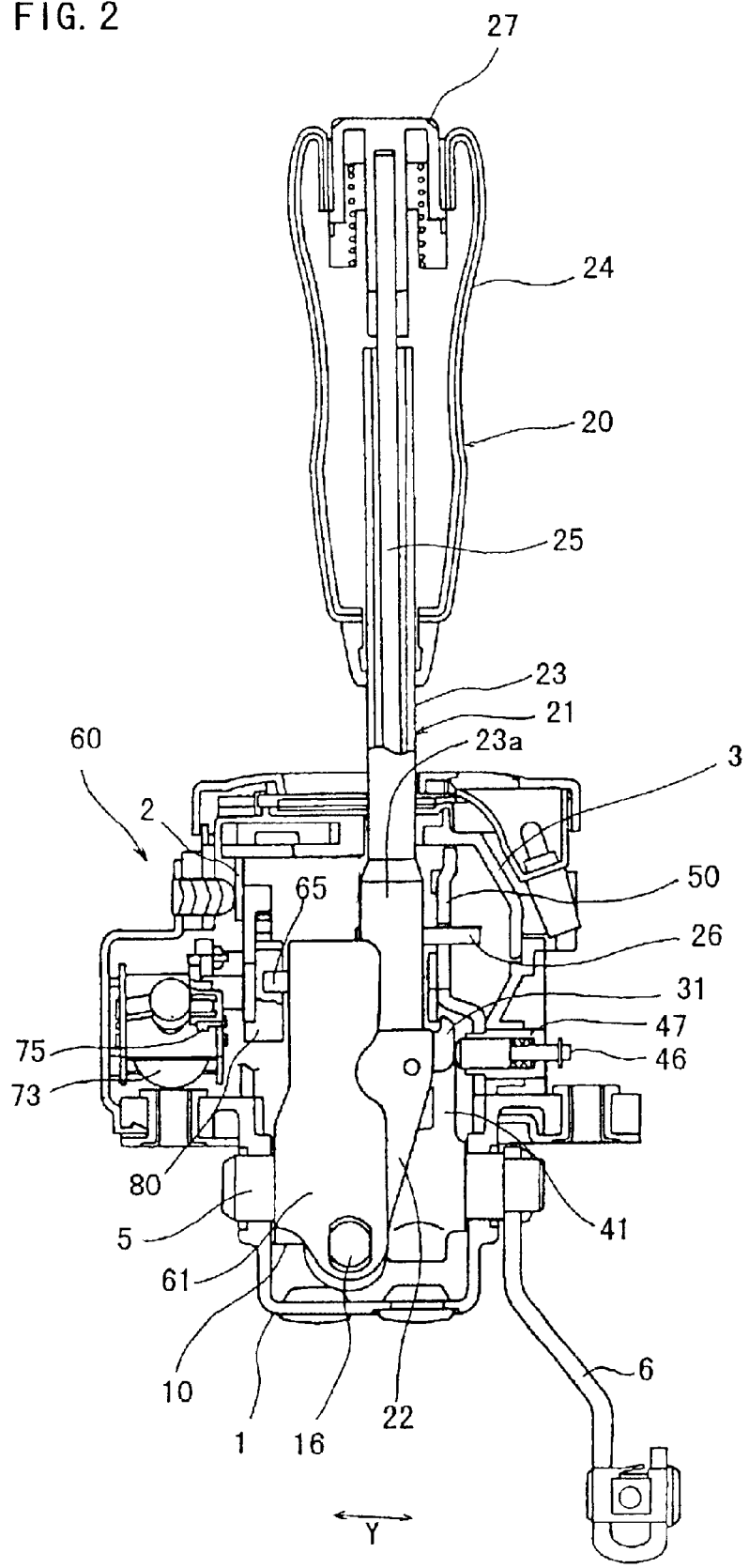
FIG. 2 is the schematic side view seen from the arrow A of FIG. 1, partially broken away to show an inside structure, in an automatic transmission (AT) mode position.
Figure 3:
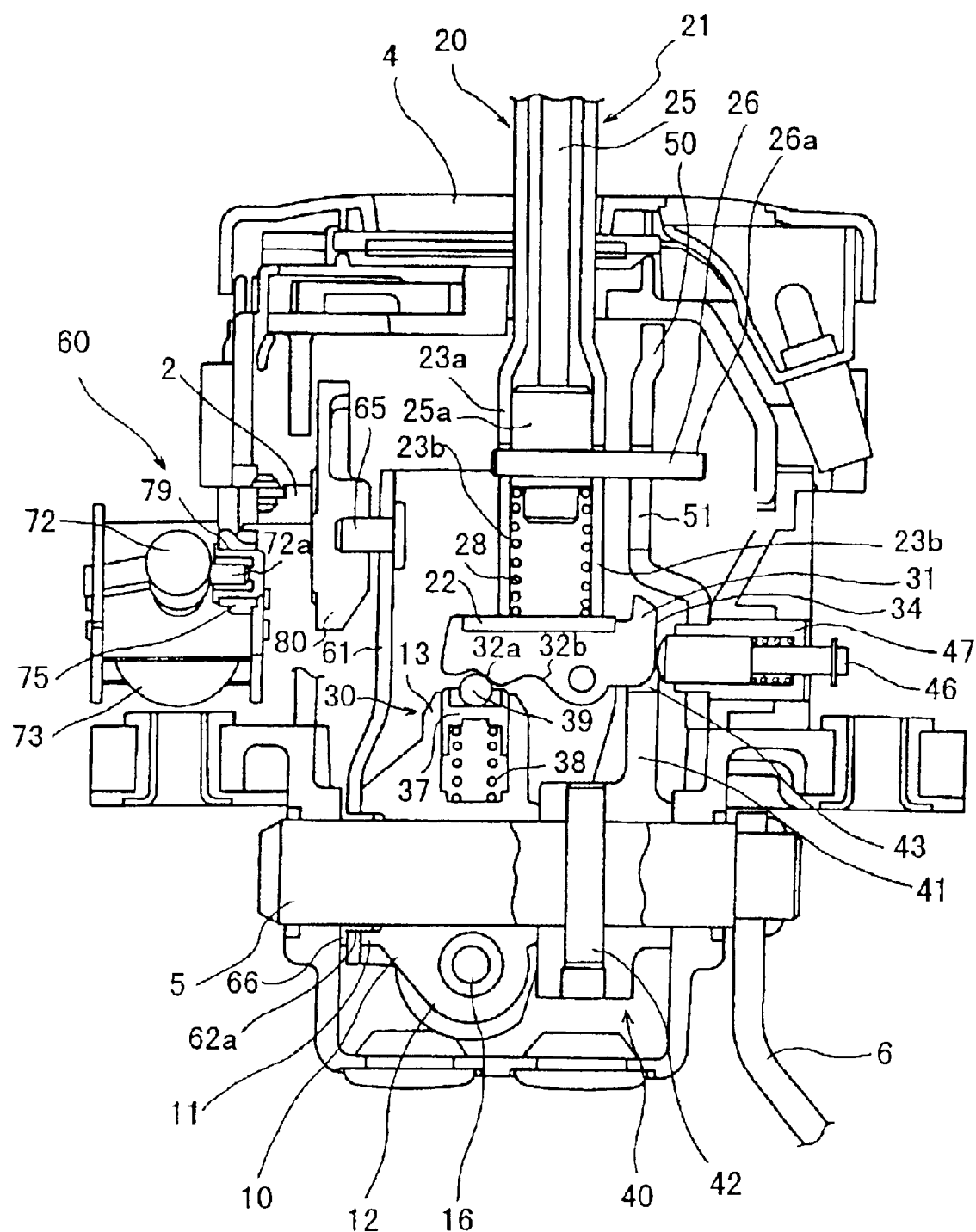
FIG. 3 is a schematic cross sectional view taken on line I—I of FIG. 1, in the AT mode position.
Figure 4:
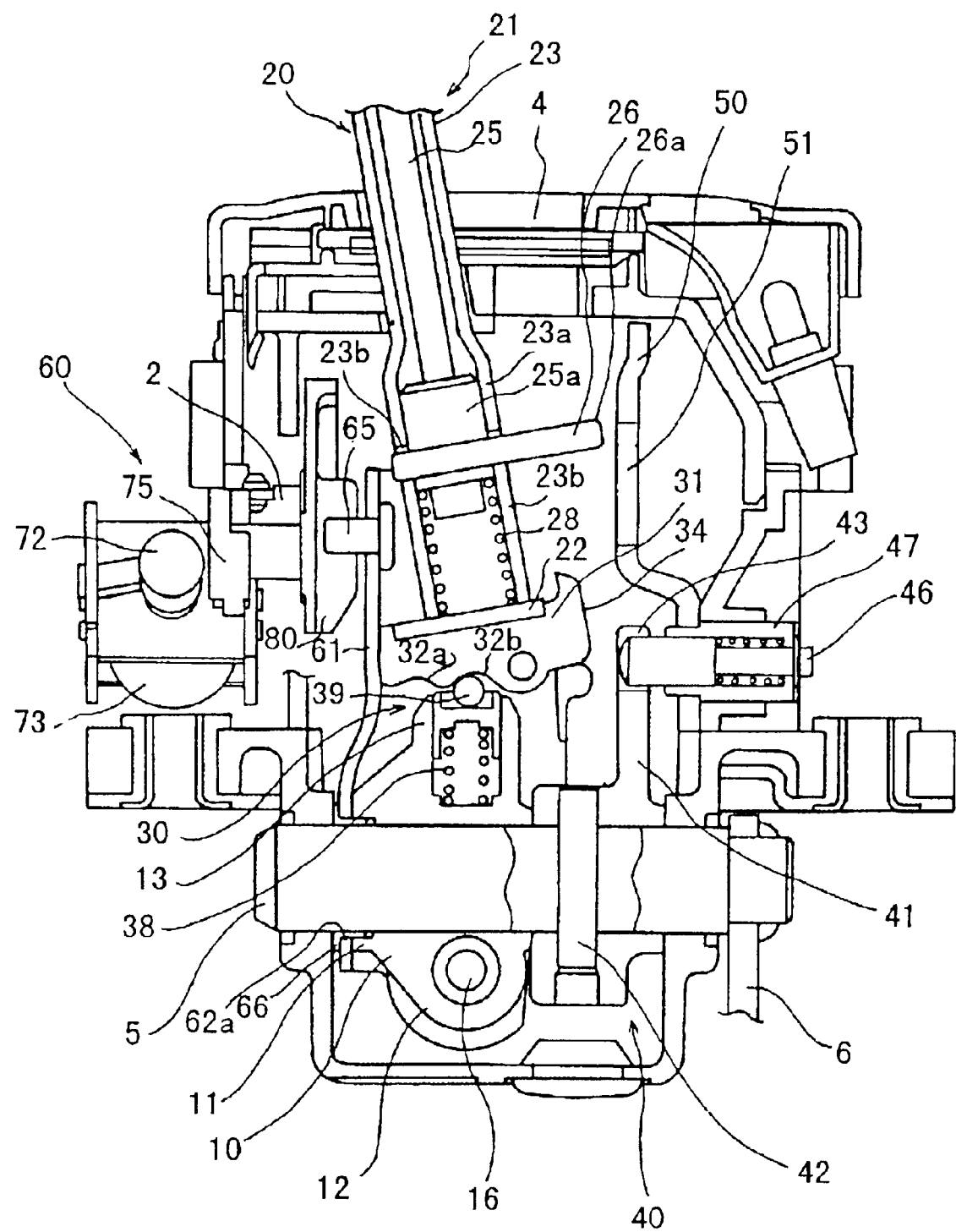
FIG. 4 is the schematic side view seen from the arrow A of FIG. 1, in a manual transmission (MT) mode.
Figure 5:
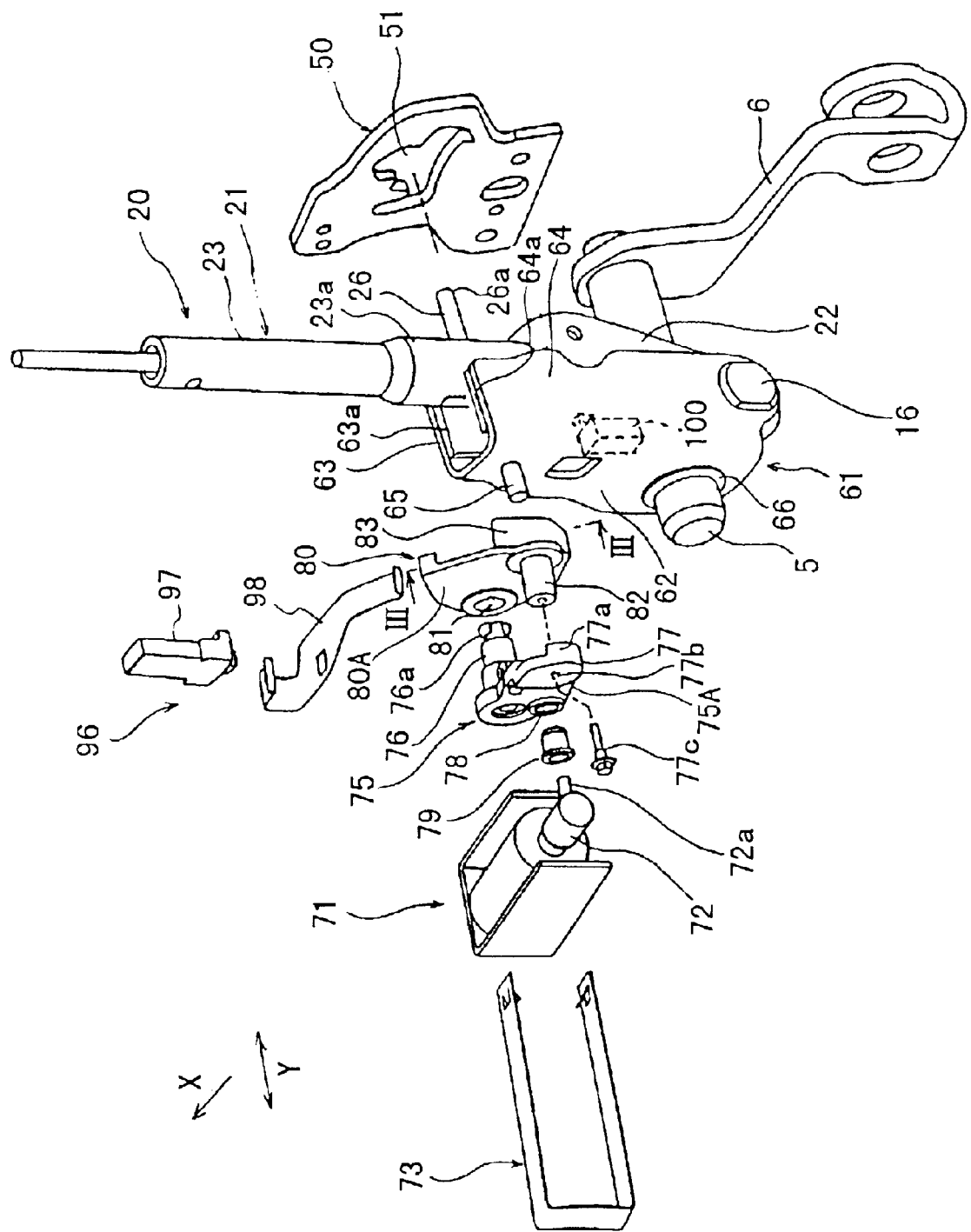
FIG. 5 is an exploded perspective view of a main part of the first embodiment shown in FIG. 1.

This transmission control device is mounted on a vehicle floor and near a seat for a driver, for example, between the seat for the driver and a seat for a passenger. FIG. 1 is a schematic side view of this embodiment. FIG. 2 is the schematic side view seen from the arrow A of FIG. 1, partially broken, in the AT mode position. FIGS. 3 and 4 show a schematic cross sectional view taken on line I—I of FIG. 1 in the AT mode position and the schematic side view seen from the arrow A of FIG. 1 in the MT mode position, respectively. FIG. 5 is an exploded perspective view of a main part of the first embodiment. Arrows X and Y in each figure indicate the front direction and the widthwise direction of the vehicle body, respectively.

Figure 6:
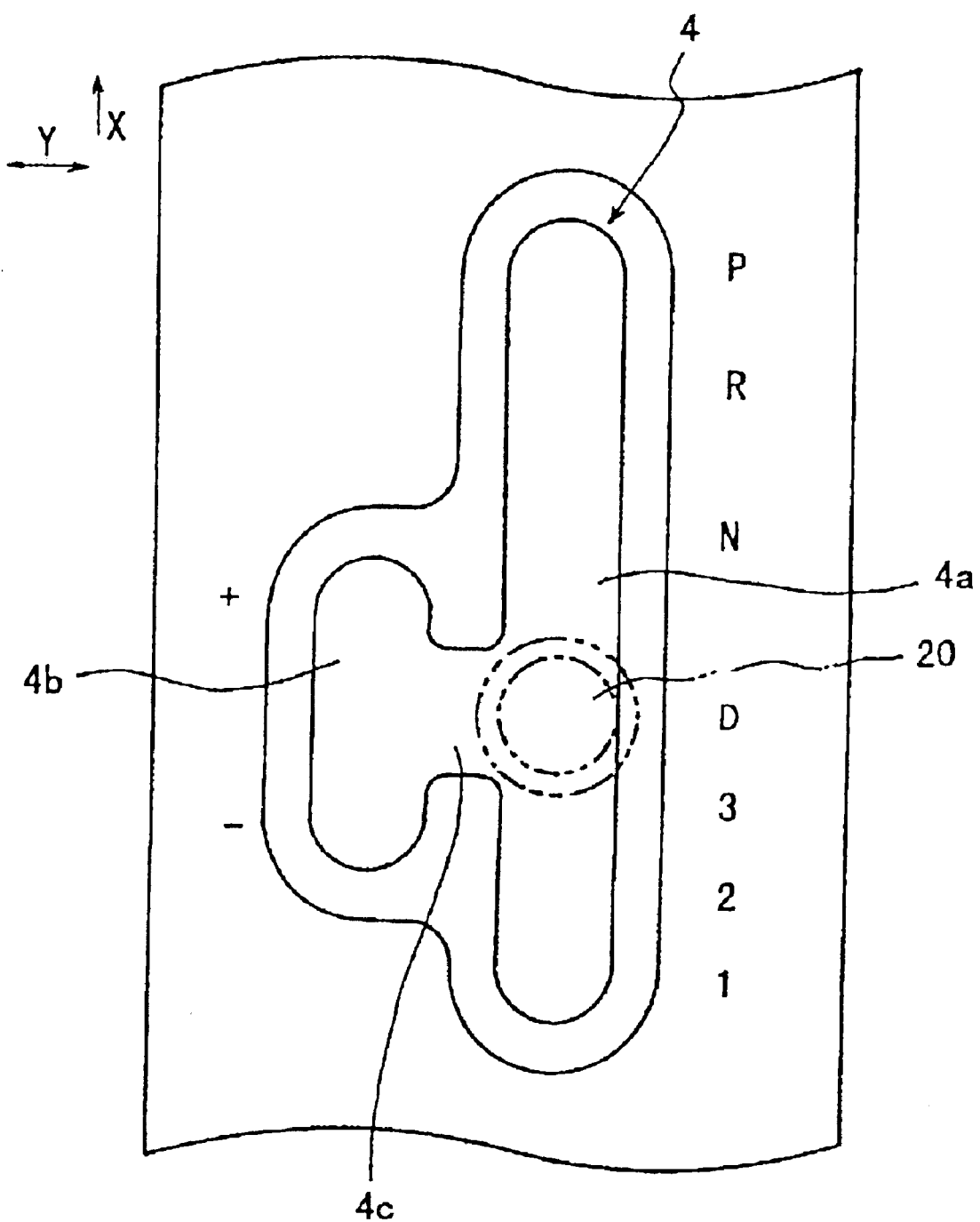
FIG. 6 is a top view of an upper housing.

Reference numeral 3 designates an upper housing 3 mounted on a lower housing 1. As shown in FIG. 6, a gate 4 as an opening having a substantially H shape configuration is provided in a top surface of the upper housing 3. The gate 4 has an AT mode gate 4a, an MT mode gate 4b, and a communicating gate 4c for communicating the gate 4a with the gate 4b. The AT mode gate 4a contains range positions, that is, a series of a parking position (P position), a reverse position (R position), a neutral position (N position), a driving position (D position), a 3-speed range drive position (3-speed position), a 2-speed range drive position (2-speed position) and a 1(low)speed range drive position (1-speed position). The MT mode gate 4b containing positions for an up shift (+ position) and a down shift (− position) is arranged substantially in parallel with to the AT mode gate 4a. An up switch and a down switch (not shown) are installed, respectively corresponding to the + position and the − position of the MT mode gate 4b.

A first rotary shaft 5 extended substantially in a widthwise direction of a vehicle body is rotatably supported on the lower housing 1. A cable mounting arm 6 extended downwardly is secured at an anchor end to one end of the first rotary shaft 5 and is connected at a tip end to the automatic transmission (not shown) through a select cable 7.

A select lever 20 is rotatably supported on the first rotary shaft 5 through a joining member 10. The first rotary shaft 5 is fitted into a tubular base part of a detent lever 41 used in a detent system 40 placed adjacent to the joining member 10, and is combined with the base part by a pin 42.

The joining member 10 has a tubular base part 11 rotatably supported on the first rotary shaft 5, a supporting part 12 for a third rotary shaft 16 extending downwardly from the tubular part 11, and a roller holding part 13 extending upwardly from the tubular part 11 as shown in FIG. 3 and FIG. 4. The third rotary shaft 16 extends substantially perpendicularly to the first rotary shaft 5 and is below the first rotary shaft 5 and is rotatably fitted into the supporting part 12. The roller holding part 13 is used in an AT/MT mode maintaining system 30 as will be described below.

The select lever 20 has a lever body 21 thereof which is formed with a tubular member 23 and a lever bracket 22 supported on the joining member 10 through the third rotary shaft 16 as shown in FIGS. 2–4. A lower part 23a of the tubular member 23 increases in diameter and is connected to the top end of the lever bracket 22. The lower part of the lever bracket 22 is divided into a front part and a rear part, between which the joining member 10 is held. The tubular member 23 contains in the lower part 23a a pair of slits 23b extending in an extended direction of the select lever 20 and opposing each other for inserting a guide pin 26, and contains a hollow grip 24 at the top end. A below described detent member 31 is connected to the upper part of the lever bracket 22.

An operating rod 25 is inserted into the tubular member 23 of the lever body 21, a bottom part 25a of which is vertically movably fitted into the lower part 23a of the tubular member 23. The operating rod 25 holds a guide pin 26 extending in a longitudinal direction of the first rotary shaft 5 in the bottom part 25a, both ends 26a of the guide pin 26 being projected from the slits 23b. The operating rod 25 is connected at a top end 25b to a vertically movable operating button 27 held on the top end of the grip 24 through the tubular member 23 and the hollow grip 24. Within the tubular member 23 and between the bottom part 25a of the operating rod 25 and the lever bracket 22, a spring 28 is provided for biasing the operating rod 25 upwardly.

Therefore, the select lever 20 is arranged to rotate around the first rotary shaft 5 supported on the lower housing 1 in the lengthwise direction of the vehicle body, and also to rotate on the third rotary shaft 16 in the longitudinal direction of the first rotary shaft 5, that is, the widthwise direction of the vehicle body. Furthermore, the guide pin 26 is arranged to move downwardly along the slits 23b by pressing the operating button 27 against a biasing force of the spring 28, and to move upwardly along the slits 23b by releasing the pressing operation.

As shown in FIG. 3, provided is the AT/MT mode maintaining system 30 having the detent member 31 mounted on the top part of the lever bracket 22 and a holding part 37 placed in the joining member 10 within the lever bracket 22. The AT/MT mode maintaining system 30 controls the rotation of the select lever 20 around the third rotary shaft 16 to a position for either the AT mode or the MT mode, as shown in FIG. 2 and FIG. 3.

As shown in FIG. 3, provided is the AT/MT mode maintaining system 30 having the detent member 31 mounted on the top part of the lever bracket 22 and a holding part 37 placed in the joining member 10 within the lever bracket 22. The AT/MT mode maintaining system 30 controls the rotation of the select lever 20 around the third rotary shaft 16 to a position for either the AT mode or the MT mode, as shown in FIG. 3 and FIG. 4.

The holding part 37 has a roller 39 which is pressed into either the recess for AT mode 32a or the recess for MT mode 33a provided in the detent member 31 by a spring 38 placed within the tubular roller holding part 13 of the joining member 10.

The above AT/MT mode maintaining system 30 maintains the select lever 20 to the AT mode positions by pressing the roller 39 into the recess for AT mode 32a of the detent member 31 by the spring 38 as shown in FIG. 3. After moving the select lever 20 around the third rotary shaft 16, the AT/MT mode maintaining system 30 maintains the select lever 20 to the MT mode position by pressing the roller 39 pushed by the spring 38 into the recess for MT mode 32b.

The detent system 40 comprises the detent lever 41 and a detent plate mounted on the lower housing 1 (not shown). The first rotary shaft 5 is fitted into the tubular base part of the detent lever 41. The detent system 40 maintains the select lever 20 in the range positions for the AT mode stepwise by engaging a roller (not shown) provided in the detent lever 41 with one of plural recesses continuously formed in the detent plate corresponding to range positions for the AT mode. As to the detent system 40, further detail is not described because further details are not material to the present invention.

This transmission control system of the present invention has a relative location defining system, for defining a relative location between the select lever 20 and the detent lever 41 and for permitting a relative rotation between the detent lever 41 and the select lever 20 during the rotation of the select lever to the MT mode position.

Furthermore, a lock pin 46 pushed toward the detent lever 41 by a spring is mounted on the lower housing 1. When the select lever 20 has the AT mode position, the detent lever 41 is released from the lock pin 46, because the lock pin 46 is pushed into a pin guide 47 by the lock pin pushing part 34 of the detent member 31 inserted into the recess 43 for receiving the lock pin 46 provided in the detent lever 41 In the MT mode position of the select lever 20, the lock pin pushing part 34 moves away from the lock pin receiving recess 43, and then the lock pin 46 is inserted into the recess 43 by the spring to maintain the detent lever 41 in the D position.

Figure 7:
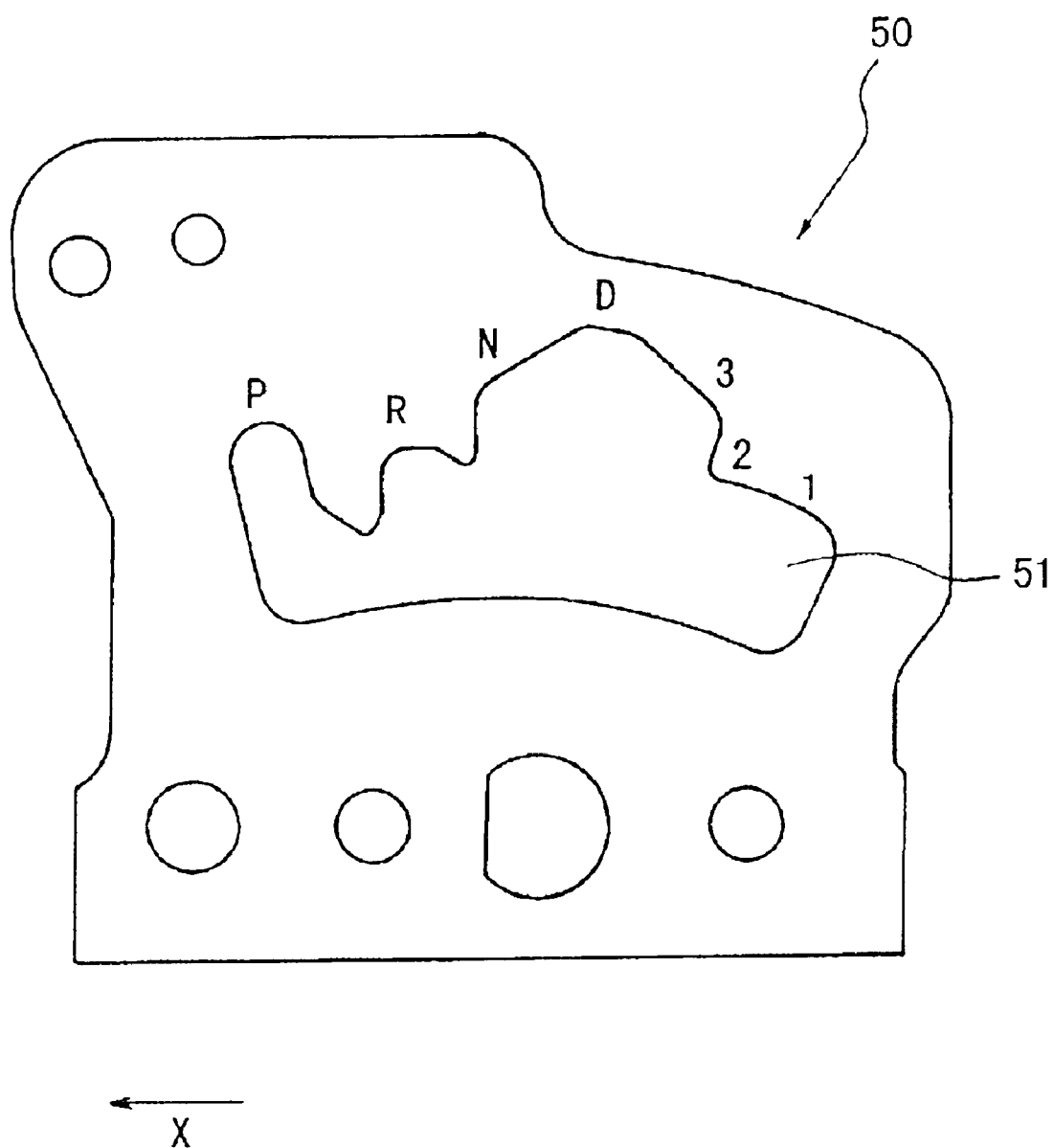
FIG. 7 is a side view of a lock plate.

A lock plate 50 formed in the lower housing 1 contains a guide opening 51 inserted by one end 26a of the guide pin 26 in the AT mode position. The guide opening 51 contains, as shown in FIG. 5 and FIG. 7, a series of the P position, the R position, the N position, the D position, the 3-speed position, the 2-speed position and the 1-speed position corresponding to the range positions of the select lever 20. A projection is formed between the P position and the R position. The series of the D position, the N position and the R position is provided in a stepwise direction, the N position is higher than the R position, and the D position is at the highest position. The series of the D position, the 3-speed position and the 2-speed position is also provided in the stepwise direction, the 3-speed position is lower than the D position, and the 2-speed position is lower than the 3-speed positions. The 1-speed position is provided adjacent to the 2-speed position.

The shift lock system 60 for prohibiting selective operations of the select lever 20 is located on the side 2 of the lower housing 1 as shown in FIGS. 3 and 4.

The lock shift system 60 mainly comprises the lock pin 65 provided on a lock pin bracket 61, an electric solenoid 71 as the driving means, a link member 75 rotatably mounted on the outside of the side 2 of the lower housing 1, and a lock member 80 rotatably mounted on the inside of the side 2.

The lock pin bracket 61 with the lock pin 65 includes a lateral surface extending substantially perpendicularly to the longitudinal direction of the first rotary shaft and facing the select lever, the lock pin provided on the lateral surface, and a front surface and a rear surface formed by bending at both ends of the lateral surface and opposed each other with the select lever 20 therebetween as shown in FIG. 5. The lock pin bracket 61 accommodates both the select lever 20 and the lever bracket 22. The stiffness of the lock pin bracket 61 is very high because the bracket 65 has a substantially U shape in a cross section. Therefore, the stiffness for supporting the lock pin 65 also increases.

A lower part of the lateral surface 62 is provided with an engaging opening 62a supported on the first rotary shaft 5 through a bush 66, and is connected to the end of the base part 11 of the joining member 10. Furthermore, the lower parts of the front surface 63 and the rear surface 64 are connected to the third rotary shaft 16 supported on the first rotary shaft 5 through the joining member 10. Therefore, the lock pin bracket 61 can rotate on the first rotary shaft 5.

The lateral surface 62 of the lock pin bracket 61 is spaced from the select lever 20 and the lock pin 65 extending substantially in parallel with the longitudinal direction of the first rotary shaft 5 is projected in the opposite direction with respect to the select lever 20, so that the lateral surface 62 and the lock pin 65 can be prevented from contact of the select lever 20 when the select lever 20 moves to the MT mode position. Furthermore, stoppers 63a, 64a are placed between the select lever 20 and the upper parts of the front and rear surfaces 63, 64, for defining a distance between the select lever 20 and the front surface 63 and a distance between the select lever 20 and the rear surface 64 and also for decreasing looseness between the select lever 20 and the lock pin bracket 61.

Therefore, the select lever 20 can move to the AT mode position or the MT mode position without hindrance of the lock pin bracket 61. When the select lever 20 is turned forwardly, the lever 20 pushes the upper part of the front surface 63 forwardly through the stopper 63a. When the select lever 20 is turned backwardly, the lever 20 pushes the upper part of the rear surface 64 backwardly through the stopper 64b. Therefore, the lock pin bracket 61 can move around the first rotary shaft 5 together with the select lever 20. To the contrary, the rotation of the select lever 20 around the first rotary shaft 5 is prevented by prohibiting the rotation of the lock pin bracket 61.

Therefore, the lock pin 65 placed on the lock pin bracket 61 securely moves around the first rotary shaft 5 so as to engage respective range positions, accompanied with the selective operation of the select lever 20 to a corresponding range position. Furthermore, the rotation of the select lever 20, i.e. the selective operation of the select lever 20 is prevented by locking the lock pin 65. The stoppers 63a, 64a may be placed on the select lever 20 instead of the lock pin bracket 61. Impact noise and shock caused by contact of the select lever 20 with the lock pin bracket 61 can be reduced by the stoppers 63a, 64a.

An electric solenoid 71 is mounted on the outside of the side 2 of the lower housing 1 by a clamp 73 as shown in FIGS. 1~5. With the solenoid 71 inoperative, an operating rod 72 is protruded in the rear direction of the vehicle body by a suitable biasing means such as a spring. When the solenoid 71 is turned on, the operating rod 72 is retracted against a force of the biasing means. The operating rod 72 has an engaging shaft part 72a at an end thereof extending in the widthwise direction of the vehicle body and projected into the side 2.

Figure 8:
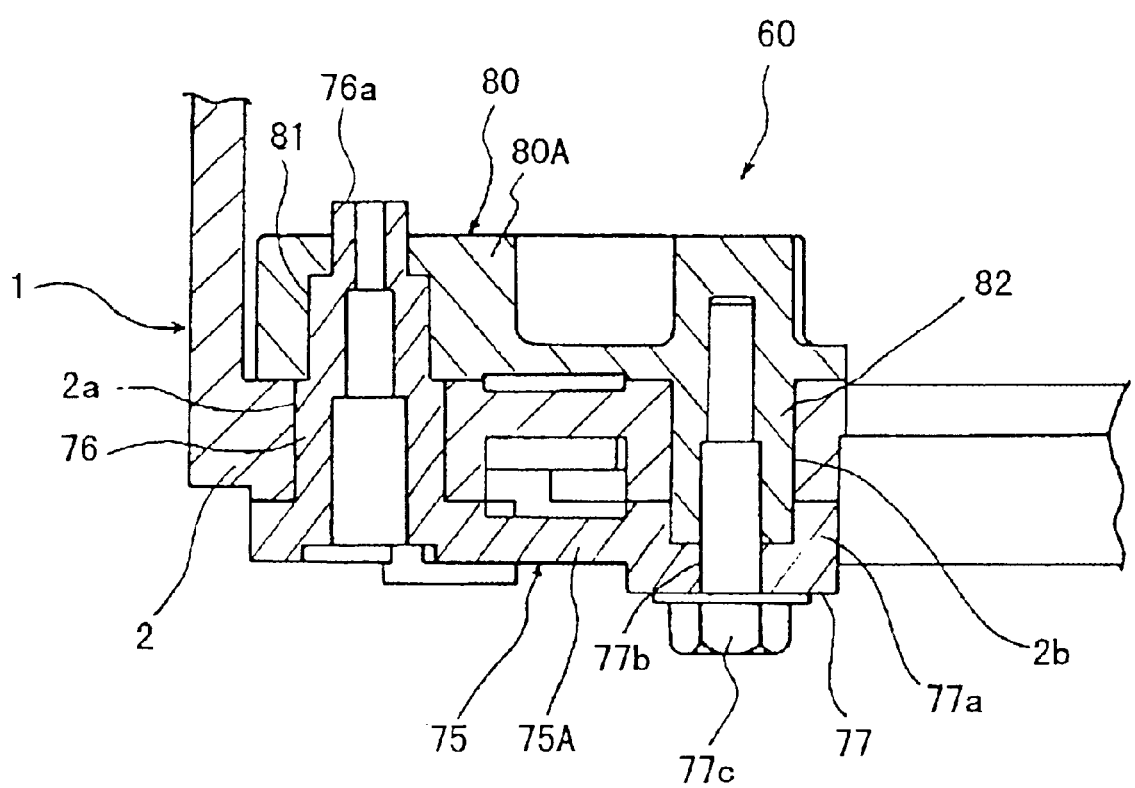
FIG. 8 is a cross sectional view taken on line II—II of FIG. 1.

As shown in FIG. 5 and in the cross sectional view taken on line II—II of FIG. 8, a link member 75 has a relatively planar base part 75A placed on the outside of the side 2. In this embodiment, a second rotary shaft is integral with the link member 75 as a rotary shaft part 76 thereof The rotary shaft part 76 having a cylindrical shape with a radially stepped portion is provided in a front region of the base part 75A. An engaging part 76a is formed at an end of the stepped portion. Furthermore, an engaging opening 2a having an axis of rotation is provided in the side 2 for receiving the rotary shaft part 76, the axis of rotation extending in the widthwise direction of the vehicle body. The rotary shaft part 76 is projected into the engaging opening 2a and rotatably supported on the side 2. The base part 75A has an engaging projection 77a having an arc shape configuration for receiving an end of a link pin which is integral with a lock member 80 as a link part 82 of the lock member 80, and a lock member connecting part 77 having an opening 77b for receiving a bolt in a rear end region thereof. Furthermore, the base part 75A has an engaging opening 78 for receiving the engaging shaft part 72a of the electric solenoid 71 through a substantially tubular cushion 79 in a medium region thereof.

The lock member 80 has a base part 80A having a substantially semidisc shape and facing the base part 75A of the link member 75 by interposing the side 2 of the lower housing 1 therebetween. A link opening 81 for receiving the end of the rotary shaft part 76 of the link member 75 is provided in the front region of the base part 80A, the end of the rotary shaft part 76 being projected from the engaging opening 2a provided in the side 2. Provided is an engaging part (not shown) for engaging with the engaging part 76a as an engaging means on the inner surface of the opening 81. The engaging means engages with the part 76a by rotating after inserting the end of the rotary shaft part 76 into the opening 81

The cylindrical link part 82 is provided in the rear region of the base part 80A. An end of the link part 82 engages with the engaging projection 77a provided in the rear end region of the link member 75 and is connected to the lock member connecting part 77 of the link member 75 by a bolt 77c inserted in the opening 77b. Therefore, the lock member 80 is integrally connected to the link member 75. The side 2 of the lower housing 1 is provided with an engaging opening 2b for the link part 82 having an arc shape, the center of the arc being on the axis of the engaging opening 2a. The link part 82 received in the opening 2b can move around the rotary shaft part 76 so as to draw the arc within the arc shaped opening 2b.

A connection of the link member 75 to the lock member 80 is carried out as follows. The rotary shaft part 76 of the link member 75 is inserted into the engaging opening 2a provided in the side 2 and then the end of the rotary shaft part 76 projected from the engaging opening 2a is inserted into the link opening 81 of the lack member 80. The link part 82 is inserted into the opening 2b. Therefore, the base part 75A of the link member 75 and the base part 80A of the lock member 80 oppose to each other by interposing the side 2 therebetween. The relative location between the link member 75 and the lock member 80 is defined by contacting the end of the link part 82 to the engaging projection 77a after rotating the link member 75 and the lock member 80 around the rotary shaft part 76 and the opening 81, which are already engaged. Finally, the engaging part 76a of the rotary shaft part 76 is engaged with the engaging part provided on the inner surface of the opening 81, and the lock member contacting part 77 of the link member 75 is connected to the link part 82 by means of the bolt 77c inserted into the opening 77b.

The link member 75 and the lock member 80 can be easily installed in the small-sized transmission control device in the above connecting manner between the link member 75 and the lock member 80. Therefore, assembling the shift lock system 60 can be effectively carried out. Integrating the rotary shaft part (the second rotary shaft) 76 with the link member 75 and integrating the link part (the link pin) 82 with the lock member 80 decrease the number of components to be used and steps of manufacturing. Therefore, the transmission control device of the present invention can be manufactured at a lower cost.

The reciprocating motion of the actuating rod 72 of the electric solenoid 71, that is, the retracting motion by turning on the electric solenoid 71 and the protruding motion by turning off the solenoid 72, is converted into the rotating motion of the link member 75 around the rotary shaft part 76 as a center of rotation. As a result, the lock member 80 integrally connected to the link member can easily move around the rotary shaft part 76 so that the link part 82 draws the arc within the arc shaped opening 2b provided in the side 2, the center of the arc being on the axis of the engaging opening 2a.

Figure 9:
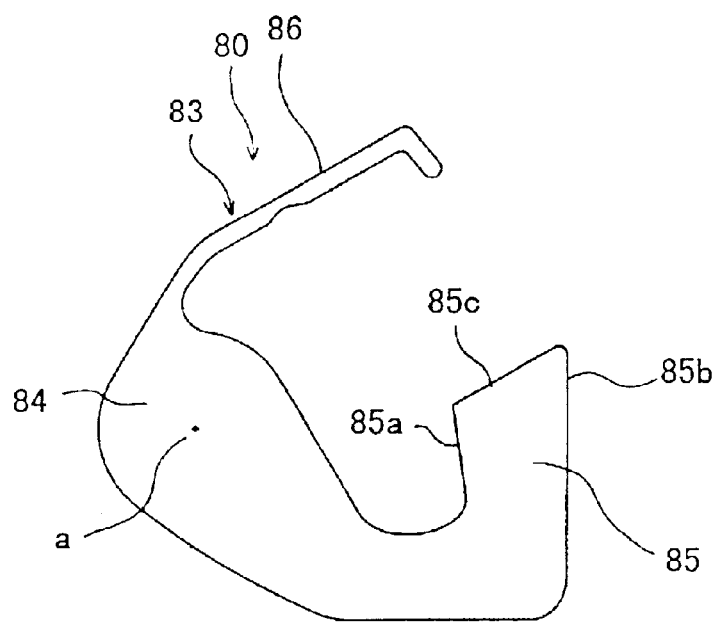
FIG. 9 is a cross sectional view taken on line III—III of FIG. 5.

As shown in FIG. 9, a cross sectional view taken on line III—III of FIG. 5, a lock member 80 includes a lock pin fixing part 83 having a substantially C shape configuration in a cross section along an edge of the base part 80A, the lock pin fixing part 83 being opposed to the lateral surface 62 of the lock pin bracket 61.

Figure 10:
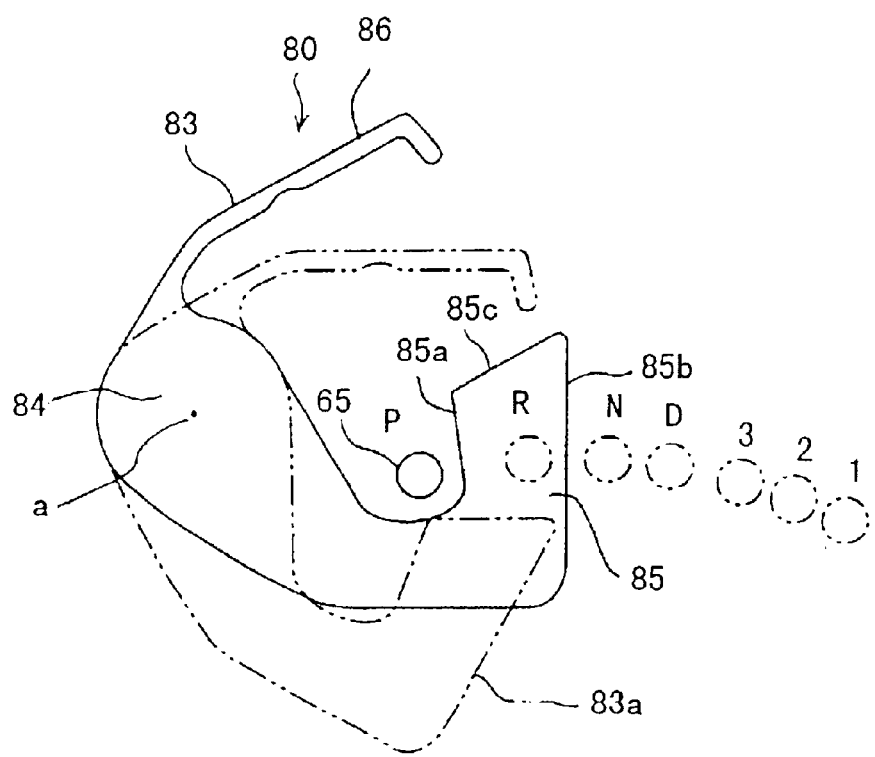
FIG. 10 shows a relative location between a lock pin controlling part of a lock member and a lock pin, in each range position of the AT mode position.

As known from a drawing showing a relative location between a lock pin controlling part of a lock member 85 and a lock pin 65 in each range position of the AT mode position of FIG. 10, the lock pin fixing part 83 has the front part 84, a lock part 85 having a substantially U shape configuration extending backwardly from the bottom portion of the front part 84, and a lock releasing part 86 extending backwardly from the top portion of the front part 84. The symbol "a" in FIG. 10 shows an axis of a rotation of the lock member 80, which is located coaxially to the rotary shaft part 76.

The lock part 85 has an enough width to contact a periphery of the lock pin 65 in the AT mode position. A front edge, a rear edge and a top edge of the lock part 85, these edges being formed substantially evenly, respectively correspond to a first engaging surface 85a, a second engaging surface 85b, and a third engaging surface 85c. The arrangement is such that the lock part 85 is located between the position to be occupied by the lock pin 65 in the P position and the position to be occupied by the lock pin 65 in the N position when the electric solenoid 71 is inoperative. That is, the lock part 85 can be at the position to be occupied by the lock pin 65 in the R position as shown in the solid lines of FIG. 12. When the electric solenoid 71 is turned on, the lock part 85 moves away from the movement track of the lock pin 65 as shown in the imaginary lines 83a.

As shown in FIG. 1, an elastic component, for example, a stopper made of a rubber 70, is connected to the link member 75 for defining positions between the lock member 80 and the link member 75 in the unlock position by contacting the stopper 70 with the bottom end of the upper housing 3. The stopper 70 also reduces impact noise and shock caused when the link member 75 and the lock member 80 rotate to have the unlock position.

Figure 11:
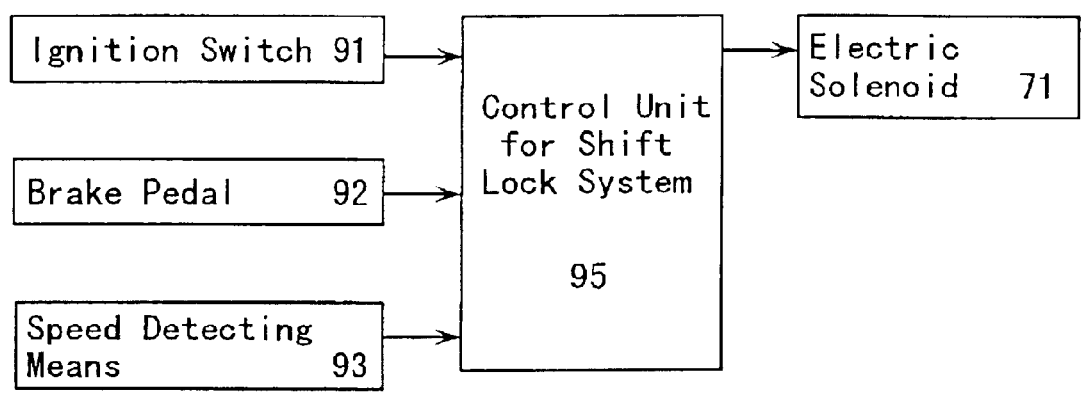
FIG. 11 is a schematic block diagram explaining operations of a control unit for a shift lock system.

The shift lock system 60 comprises a shift lock control device 95 for actuating the electric solenoid 71 when all of three kinds of signals, an ignition switch signal, a brake pedal actuation signal, a signal showing driving of the vehicle at a slower speed than a predetermined speed, for example, at a slower speed than 10 km/h, the last signal provided from a speed detecting means 93, are provided as shown in a block diagram of FIG. 11.

Reference numerical 96 in FIG. 5 indicates lock position releasing means arranged such that the releasing means 96 releases the lock position under certain conditions when the ignition switch 91 is inoperative. When a shift lock releasing button 97 is actuated, the means 96 presses the lock releasing part 86 provided in the lock pin fixing part 83 of the lock member 80 through a spring 98 for rotating the lock member 80 around the rotary shaft part 76 to the unlock position.

An AT/MT mode selective switch 100 is provided within the lock pin bracket 61. The AT/MT mode selective switch 100 as an on/off switch operates in accordance with either the selective operation of the select lever 20 from the AT mode position to the MT mode position or the selective operation from the MT mode position to AT mode position. The automatic transmission is set to either the AT mode or the MT mode in accordance with a signal delivered from the switch 100. In this manner of accommodating the AT/MT mode selective switch 100 within a space made from the lateral surface 62, the front surface 63, and the rear surface 64 of the lock pin bracket 61, the switch 100 can be provided without consideration of providing other specific brackets and/or the other components.

The operation of the above described transmission control device will be explained particularly with reference to FIGS. 11~13.

Suppose that the select lever 20 has the P position of the AT mode, the select lever is fixed to have the AT mode position by the AT/MT mode maintaining system 30, and the relative location between the select lever 20 and the detent lever 41 is defined by the relative location defining system as shown in FIGS. 2 and 3. The relative movement between the joining member 10 and the tubular member 23 is fixed by the roller 39 press-fitted into the recess for the AT mode 32a of the detent member 31 by the spring 38 provided in the roller holding part 13 supported on the first rotary shaft 5. As a result, the select lever 20 maintains the AT mode position.

In this case, as the end part 26a of the guide pin 26 is engaged in the P position of the guide opening 51 provided in the lock plate 50, the select lever 20 maintains the P position by the detent system 40, and the cable mounting arm 6 supported on the first rotary shaft 5 is also held in the P position.

Furthermore, the lock member 80 of the shift lock system 60 maintains a P/N lock position, which means the position of the lock member 80 in which the lock member 80 can bring the lock part 85 into contact with the periphery of the lock pin in both the P position and the N position. In the P/N lock position, the lock part 85 is located between the position to be occupied by the lock pin in the P position and the position to be occupied by the lock pin in the N position, as shown in FIG. 12.

With the ignition switch 91 inoperative, or when only the ignition switch 91 is actuated and the brake pedal is not actuated, the electric solenoid is not operated. As a result, the lock member 80 maintains the P/N position. In this case, the rotation of select lever 20 is prohibited because the periphery of the lock pin 65 in the P position engages with the first engaging surface 85a of the lock part 85, even if the guide pin 26 goes down by pushing the operating button 27. Therefore, an improper selective operation of the select lever 20 to the other range positions is securely prohibited.

When both the ignition switch 91 and the brake pedal 92 are actuated, and the vehicle is driven at a slower speed than a predetermined speed, the electric solenoid 71 is turned on by the control unit for the shift lock system 95, which received the three signals, that is, the ignition switch signal, the brake pedal actuation signal, and the signal showing driving of the vehicle at a slower speed than the predetermined speed.

By actuating of the electric solenoid 71, the actuating rod 72 is retracted by a predetermined length, therefore, the lock member 80 moves around the rotary shaft part 76 supported on the side 2 together with the link member 75 integrally connected thereto. Accompanied by the rotation of the lock member 80, the lock part 85 moves away from the movement track of the lock pin 65 as shown by the imaginary lines 83a of FIG. 12. As a result, the contact of the lock pin 65 and the lock part 85 is avoided. Therefore, the selective operations of the select lever 20 to the other range positions are carried out by downward movement of the guide pin 26 after pushing the operating button 27

Figure 12:
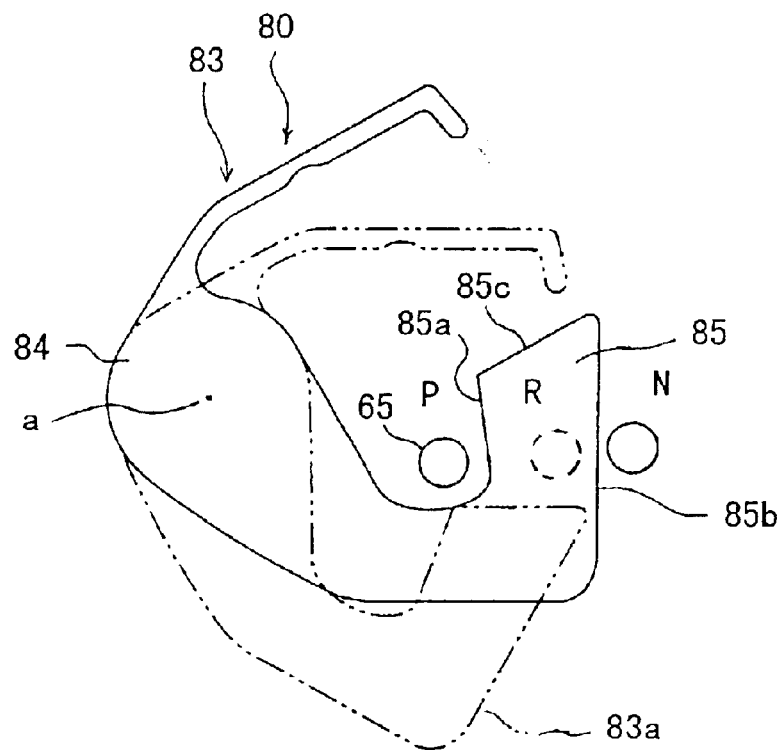
FIG. 12 is a diagram explaining a mechanism for prohibiting a selective operation of a select lever.
Figure 13:
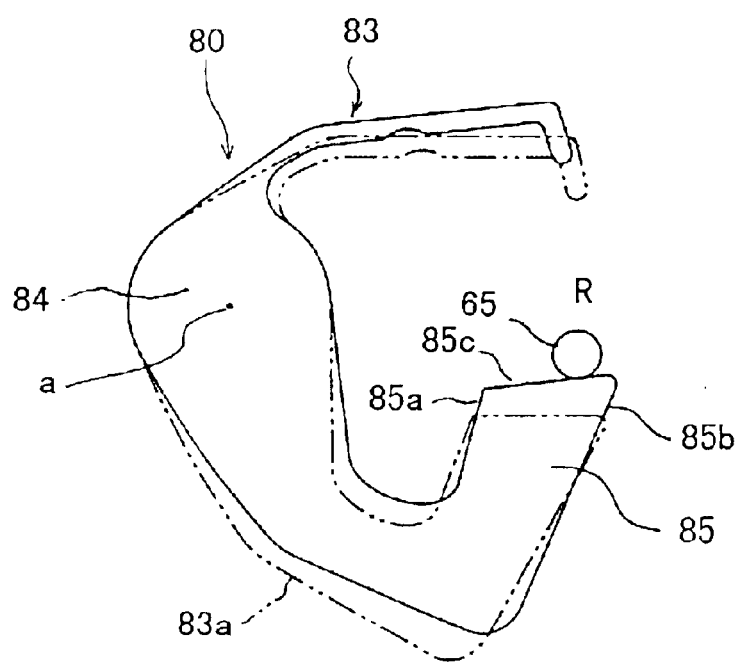
FIG. 13 is another diagram explaining a mechanism for prohibiting the selective operation.

When the brake pedal 92 is not actuated, the lock member maintains the P/N lock position shown in FIG. 12 because of to the inoperative electric solenoid. In this case, an improper selective operation of the select lever 20 from the N position or the D position to the R position or the P position is prohibited, even if the selective operation is attempted to be carried out by downward movement of the guide pin 26 after pushing the operating button 27, because the second engaging surface 85b of the lock part 85 engages with the periphery of the lock pin 65 in the P/N position.

When the brake pedal 92 is actuated, the operating rod 72 is retracted by the operation of the solenoid 71. Therefore, the link member 75 and the lock member 80 move around the rotary shaft part 76 supported on the side 2 to have the unlock position in which the lock part 85 is apart from the movement track of the lock pin 65 as shown by the imaginary lines 83a of FIG. 12. The selective operation of the select lever 20 is permitted because the contact of the periphery of the lock pin 65 and the second engaging surface 85b is avoided.

On the other hand, when the vehicle is driven forwardly at the predetermined speed or more, the electric solenoid 71 is not turned on, even if the brake pedal 92 is actuated. As a result, the lock member maintains the P/N lock position of FIG. 12. In this position, the selective operation of the select lever 20 from the N position to the R position or P position is prohibited because the second engaging part 85b of the lock part 85 engages with the periphery of the lock pin 65. Therefore, an improper selective operation from the N position to the R position or the P position during driving forwardly is securely prohibited, and the noise of the transmission, the shock to the passenger and the damage of the transmission are effectively avoided.

For reverse operation of the vehicle, the selective operation of the select lever 20 from the P position or the N position to the R position is carried out when the brake pedal 92 is actuated. At this time, the PAN lock position is released. When the operation of the brake pedal 92 ceases, the electric solenoid 71 is turned off, and the lock member 80 moves to the P/N lock position. Accompanied with movement of the lock member 80 to the P/N lock position, the lock member 80 is fixed in an R lock position shown in FIG. 13 in which the third engaging surface 85c of the lock part 85 engages with the periphery of the lock pin 65. Therefore, the select lever 20 maintains the R position through the lock pin bracket 61. In this case, the selective operation of the select lever 20 from the R position to the P position or the N position is prohibited because the lock pin 65 is fixed by the third engaging surface 85c of the lock part 85. When the vehicle is driven at the lower speed than the predetermined speed and the brake pedal 92 is actuated, the electric solenoid 71 is turned on. At this time, the selective operation to the P position or the N position is permitted because the lock member 80 moves to the unlock position shown by the imaginary lines 83a of FIG. 12.

When the vehicle is driven in the reverse direction at the predetermined speed or more, however, the electric solenoid 71 is not operated, even if the brake pedal 92 is actuated. As a result, the lock member maintains the R lock position of FIG. 13. In this position, the selective operation of the select lever 20 to any of the other range positions is prohibited because the third engaging part 85c of the lock part 85 engages with the periphery of the lock pin 65. Therefore, the improper selective operation from the R position to any of the other range positions during driving in the reverse running direction of the vehicle is securely prohibited, and the noise of the transmission, the shock to the passenger, and the damage of the transmission are effectively avoided.

The selective operations of the select lever 20 cause a pivotal movement of the cable mounting arm 6 through the first rotary shaft 5. The automatic transmission is controlled in accordance with a movement of the select cable 7 mounted to the cable mounting arm 6.

Changing from the AT mode to the MT mode is carried out as follows. The select lever 20 moves from the AT mode position shown in FIG. 2 and FIG. 3 to the MT mode position shown in FIG. 4 when the select lever 20 in the D position of the AT mode position moves around the third rotary shaft 16 to the MT mode gate 4b along the communicating gate 4c.

Accompanied with the movement of the select lever 20 from the AT mode position to the MT mode position, one end 26a of the guide pin 26 moves away from the guide opening 51 of the lock plate 50, and the lock pin pushing part 34 of the detent member also moves away from the lock pin receiving recess 43. After removing the lock pin pushing part 34, the lock pin 46 fits into the recess 43 by the spring. The detent lever 41 is fixed in the D position by the lock pin 46, and the cable mounting arm 6 also maintains the D position through the first rotary shaft 5.

When the select lever 20 moves to have MT mode position as shown in FIG. 4, the roller 39 press-fitted into the recess for the AT mode 32a of the detent member 31 by the spring placed in the roller holding part 13 moves to the recess for the MT mode 32b against the spring force and enters into the recess for MT mode 32b. As a result, the select lever 20 is held in the MT mode position. At this time, the AT/MT mode selective switch 100 is actuated, and the transmission is changed to the MT mode in accordance with the operation of the AT/MT mode selective switch 100. In this MT mode, the linkage of the select lever 20 and the detent lever 41 defined by the relative location defining system is released, and the relative rotation between the select lever 20 and the detent lever 41 is permitted. The lock member 80 in the shift lock system 60 maintains the unlock position.

When the select lever 20 moves around the first rotary shaft 5 in the up shift direction along the gate for the MT mode 4b, the up switch is actuated by the select lever 20, and then this shift up signal is delivered to the control unit of the automatic transmission. By repeating the above operation, the automatic transmission moves to the first speed range drive, the second speed range drive, the third speed range drive in turn.

On the contrary, when the select lever 20 moves around the first rotary shaft 5 in the down shift direction along the gate for the MT mode 4b, the down switch is actuated by the select lever 20, and then the shift down signal is delivered to the control unit of the automatic transmission. By repeating the above operation, the automatic transmission moves to the fourth speed range drive, the third speed range drive, the second speed range drive in turn. Namely, operating of the shift up and the shift down is performed by the select lever 20.

The change from the MT mode to the AT mode is carried out when the select lever 20 has the neutral position of the MT mode. The select lever 20 position is changed from the MT mode position shown in FIG. 4 to the AT mode position shown in FIGS. 2 and 3 when the select lever 20 in the neutral position of the MT mode position moves around the third rotary shaft 16 to the D position of the gate for the AT mode 4a along the communicating gate 4c. Accompanied with the movement of the select lever 20 from the MT mode position to the AT mode position, the AT/MT mode selective switch 100 is actuated, and then the automatic transmission changes to the AT mode in accordance with the operation of the AT/MT mode selective switch 100. In the AT mode, the selective operation to each range position is performed by the rotation of the select lever 20 within the gate for the AT mode 4a and the operation of the operating button 27, as described above.

In this embodiment, the lock member 80 is supported on the lower housing 1 so as to move to have one of the lock position and the unlock position, and prohibits the improper selective operation by bringing the lock part 85 into contact with the periphery of the lock pin 65 placed on the lock pin bracket 61 which moves around together with the select lever 20.

During the improper selective operation, some stress from the lock pin 65 to the lock member 80 affects on both the rotary shaft part (the second rotary shaft) 76 and the supporting part for the rotary shaft part 76 (for example, the engaging opening 2a) in a direction substantially perpendicular to the longitudinal direction of the rotary shaft part 76. As a result, unbalanced stress on the rotary shaft part 76 and the supporting region is significantly reduced. Therefore, the requirement to the stiffness and wear resistance of these parts decreases, and simple structures of these parts can be obtained.

According to this embodiment, the lock part 85 of the lock member 80 enters into the movement track of the lock pin 65 for prohibiting the selective operation of the select lever 20, and the lock part moves away from the movement track of the lock pin 65 for permitting the selective operation. This configuration provides the small lock member 80, and thus the transmission device of very small size. Furthermore, the wear resistance of the rotary shaft part 76 and the supporting part (for example, the engaging opening 2a), decreases and the durable shift lock system is provided.

Furthermore, the lock pin 65 can easily rotate together with the select lever 20 by placing the lock pin 65 on the lock pin bracket which moves around the first rotary shaft 5 together with the select lever 20. Therefore, prohibition of the improper selective operation is performed in the advantageous conditions.

In this embodiment, the single lock member 80 can prohibit plural selective operations, such as the selective operation from the P position to the R position, from the N position to the R position, and from the R position to the other positions, by bringing the lock part 85 into contact with the periphery of the lock pin 65 between the position to be occupied by the lock pin 65 in the P position and the position to be occupied by the lock pin 65 in the N position.

Furthermore, the stiffness of the lock member 80 increases by integrally combining the lock member 80 with the link member 75 by the rotary shaft part 76 and the link part 82, which are spaced to each other. Therefore, deformation of the lock member 80 caused by the contact with the lock pin 65 can be suppressed, and smooth rotation of the link member 75 and the lock member 80 on the second rotary shaft 76 is guaranteed because of an accuracy increase of these parts 75, 80.

According to this embodiment, the lock system having a simple structure which is very compact and very light in weight can be is obtained. Therefore, the transmission control device of very small, very compact, and very light in weight can be obtained. The space occupied for the transmission control device also decreases.

In this embodiment, the driving means is easily structured by the electric solenoid 71, and the lock member 80 rotates from the lock position to the unlock position by the operation of the solenoid 71. The solenoid 71 is operated only when the brake pedal 92 is actuated. Therefore, it is possible to decrease the amount of electric power consumed by the solenoid 71.

(Second Embodiment)

Figure 14:
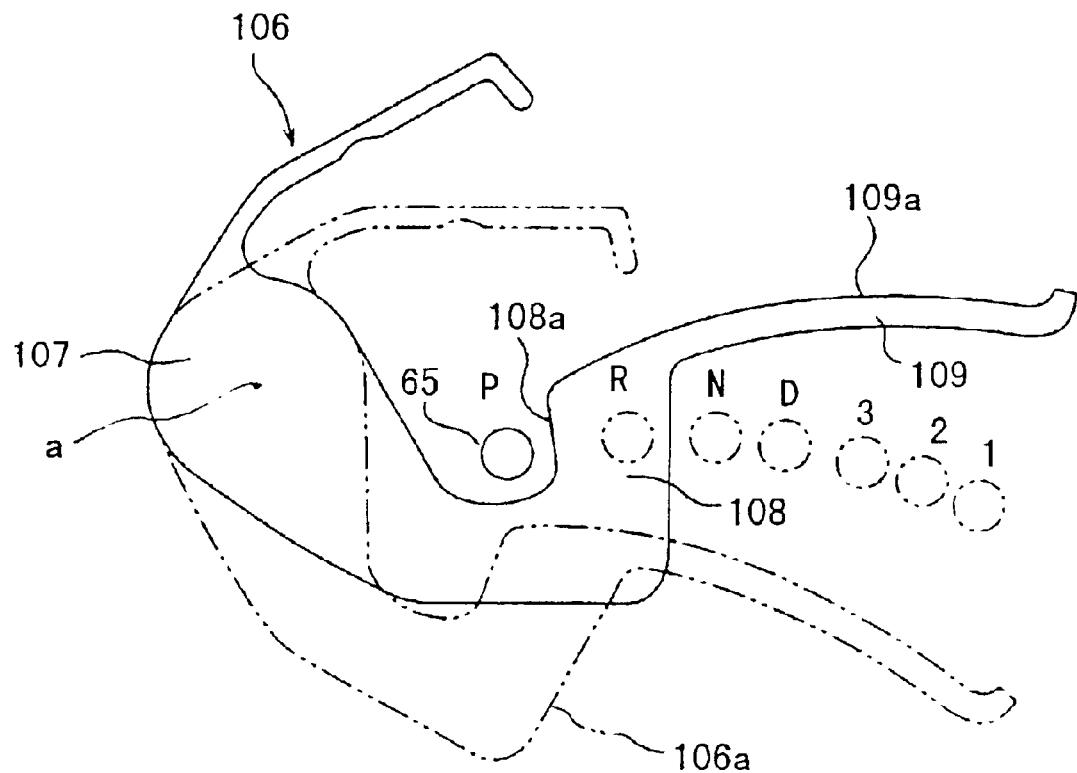
FIG. 14 is a diagram explaining a mechanism for prohibiting the selective operations in a second embodiment of the present invention.
Figure 15:
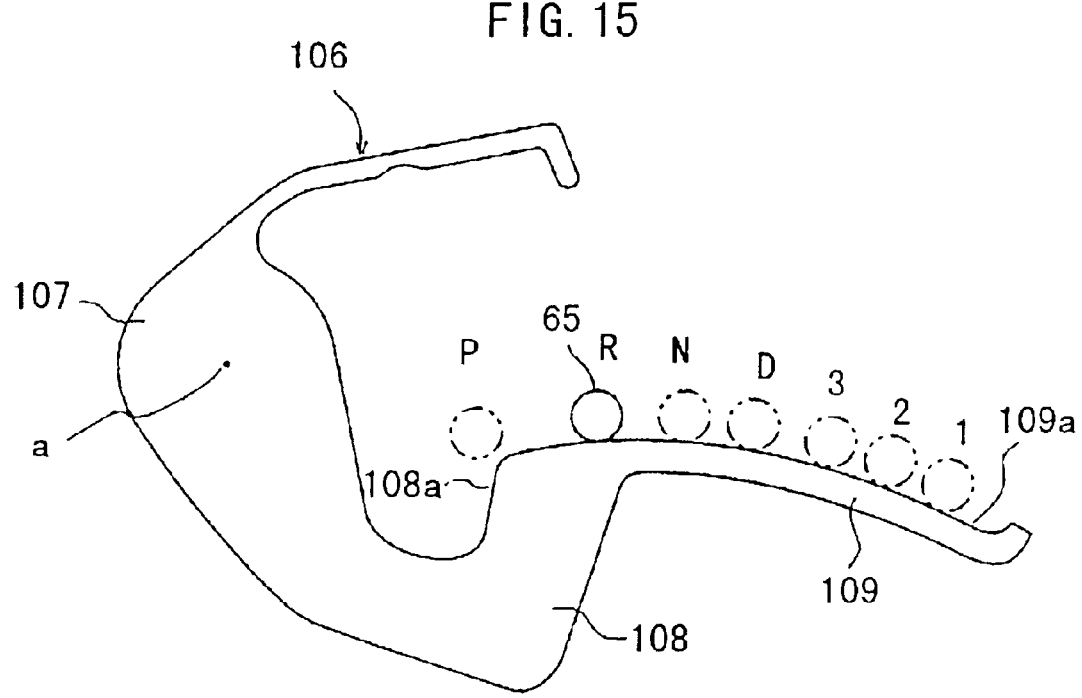
FIG. 15 is another diagram explaining the mechanism for prohibiting the selective operation.

Referring to the second embodiment of the present invention shown in FIGS. 14 and 15, this embodiment is similar to the first embodiment with the exception that it includes the lock member having a different shaped lock pin fixing part, which is provided on the base part thereof. The different part will be mainly explained below.

FIG. 14 is a cross sectional side view corresponding to FIG. 10. The lock pin fixing part 106 of this embodiment has a front part 107 located coaxially with the axis of the rotation a, a first lock part 108 having a substantially U shape configuration extending backwardly from the bottom of the front part 107, and a second lock part 109 having a moderately curved configuration extending backwardly from the top of the first lock part 108, an end of the second lock part 109 arriving at substantially a position to be occupied by the lock pin 65 in the 1-speed position.

At an inner edge of the first lock part 108, there is provided a first engaging surface 108a which is facing to the front part 107. At the top surface of the second lock part 109, there is provide the second engaging surface 109a. In other words, the lock member 80 corresponds to a variation of the first embodiment having the generally curved second lock part 109 extending from the upper end of the lock part 85.

The arrangement is such that with the electric solenoid 71 inoperative, the lock member 80 moves to a P lock position in which the first lock part 108 and the second lock part 109 are located in the movement track of the lock pin 65 as shown by solid lines of the side view of FIG. 14, and such that when the electric solenoid 71 is operated, the lock member 80 moves to an unlock position in which the parts 108, 109 are apart from the movement track of the lock pin 65 as shown by imaginary lines.

Suppose that the select lever 20 has the P position in the AT mode, the lock member 80 maintains the P lock position. With the ignition switch 91 inoperative, or when only the ignition switch 91 is actuated and the brake pedal is not actuated, the electric solenoid is not operated. As a result, the lock member 80 maintains the P position. In this case, the improper selective operation of the select lever 20 to the other range positions is prohibited because the periphery of the lock pin 65 in the P position engages with the first engaging surface 108a of the lock part 108 even if the guide pin 26 goes down by pushing of the operating button 27.

When both the ignition switch 91 and the brake pedal 92 are actuated, and the vehicle is driven at a slower speed than the predetermined speed, the electric solenoid 71 is turned on, and the lock member 80 move around the rotary shaft part 76. Accompanied with the rotation of the lock member 80, the first lock part 108 and the second lock part 109 of the lock pin fixing part 106 moves away from the track of movement of the lock pin 65 as shown by the imaginary lines 106a of FIG. 14. That is, the lock member has the unlock position, in which the contact between the lock pin 65 and the first engaging surface 108a is avoided. Therefore, the selective operations to the other range positions are permitted.

When the brake pedal 92 is not operated and the vehicle is stopped or is driven forwardly and backwardly at a slower speed than the predetermined speed, the lock member 80 maintains the P lock position (the R~1 range lock position) shown in FIG. 15 by the inoperative electric solenoid. In this case, the improper selective operation of the select lever 20 to the other range positions is prohibited because the second engaging surface 109a engages with the periphery of the lock pin 65 in the R~1 range position and the lock pin 65 is fixed by the lock member 80.

When the brake pedal 92 is actuated, the operating rod 72 is retracted by the electric solenoid 71 in accordance with the operation of the solenoid 71. Therefore, the link member 75 and the lock member 80 move around the rotary shaft part 76 supported on the side 2 so as to fit in the unlock position as shown by the imaginary lines 106a of FIG. 14. The selective operations of the select lever 20 to the other positions are permitted because the contact of the periphery of the lock pin 65 and the second engaging surface 109a is avoided.

On the other hand, when the vehicle is driven forwardly or backwardly at the predetermined speed or more, the electric solenoid 71 is not turned on, even if the brake pedal 92 is actuated. As the result, the lock member 80 maintain the P lock position (the R~1 lock position) of FIG. 14. In this position, the selective operation of the select lever 20 to the other positions is securely prohibited, and the noise of the transmission, the shock to the passenger, and the damage of the transmission are effectively avoided. According to the second embodiment, the improper selective operation is effectively prohibited not only in the P. R, N ranges but also in D, third, second, first ranges, at predetermined operating conditions.

(Third Embodiment)

Figure 16:
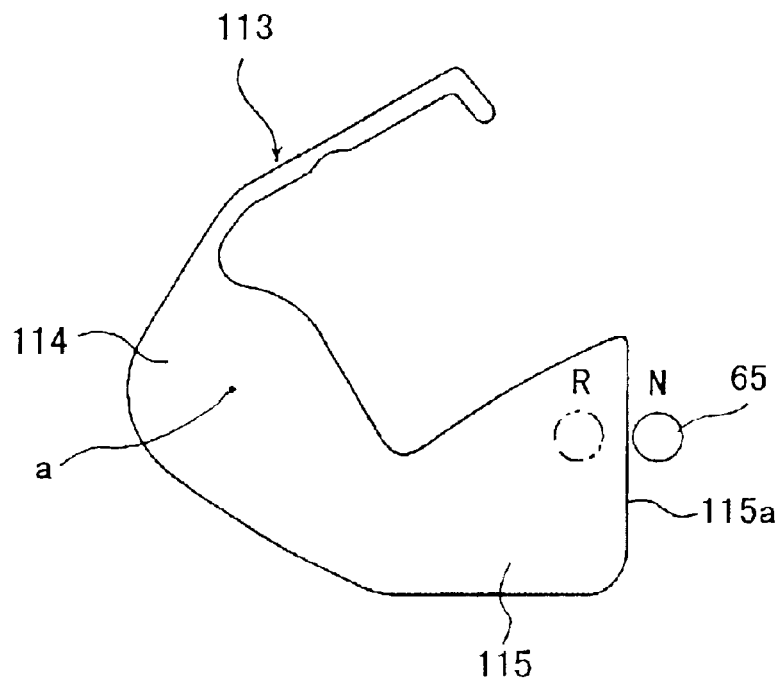
FIG. 16 is a diagram explaining the mechanism for prohibiting the selective operations in a third embodiment of the present invention.
Figure 17:
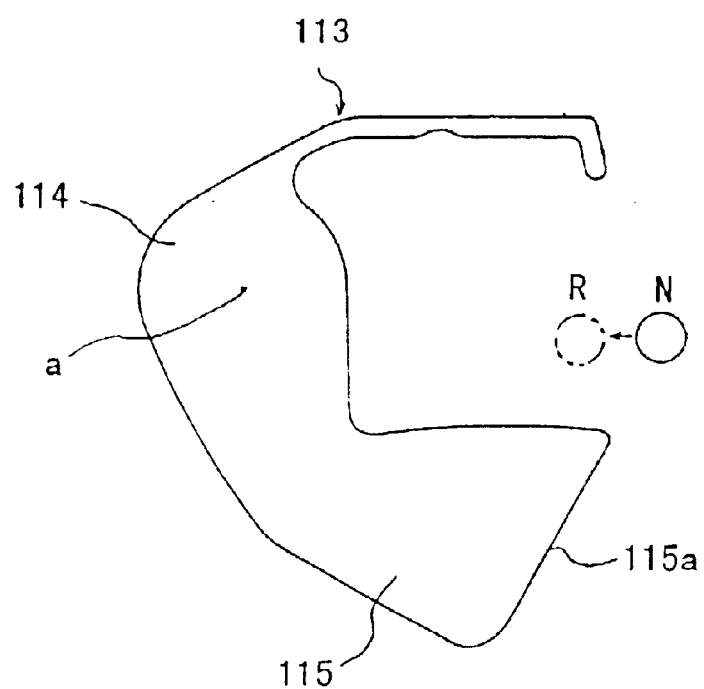
FIG. 17 is another diagram explaining the mechanism for prohibiting the selective operations.

Referring to the third embodiment of the present invention shown in FIGS. 16 and 17, this embodiment is similar to the first embodiment with the exception that it includes the lock member having a different shaped lock pin fixing part, which is provided on the base part thereof. The different part will be mainly explained below.

FIG. 16 is the cross sectional side view corresponding to FIG. 10. The lock pin fixing part 113 of this embodiment has a front part 114 located coaxially with the axis of the rotation a, a lock part 115 extending backwardly from the bottom of the front part 114. The lock part 115 is provided with an engaging surface 115a, to which the lock pin 65 in the N position can contact from the rear side thereof.

The arrangement is such that with the electric solenoid 71 inoperative, the lock part 115 is located in the movement track of the lock pin 65 as shown in FIG. 16, and such that when the electric solenoid 71 is operated, the lock part 115 is apart from the movement track of the lock pin 65 by the rotation of the lock member 80 as shown in FIG. 17.

When the brake pedal 92 is not actuated, and the vehicle is driven at the lower speed than the predetermined speed, the electric solenoid 71 is not actuated, and the lock member 80 maintains the lock position shown in FIG. 16. Therefore, the selective operation to the R position is prohibited because the periphery of the lock pin 65 engages the engaging surface 115a of the lock part 115.

When the brake pedal 92 is operated, the actuating rod 72 is retracted in accordance with the operation of the electric solenoid 71. At this time, the link member 75 and the lock member 80 move around the rotary shaft part 76 supported on the side 2 from the lock position shown in FIG. 16 to the unlock position shown in FIG. 17. Therefore, the selective operation to the R position is permitted because the contact of the lock pin 65 with the engaging surface 115a is avoided.

During the driving of the vehicle at the predetermined speed or more, when the brake pedal 92 is actuated, the improper selective operation to the R position is securely prohibited according to the inoperative solenoid 71. Furthermore, the noise of the transmission and the shock to the passenger, and the damage of the transmission are effectively avoided.

(Fourth Embodiment)

Figure 18:
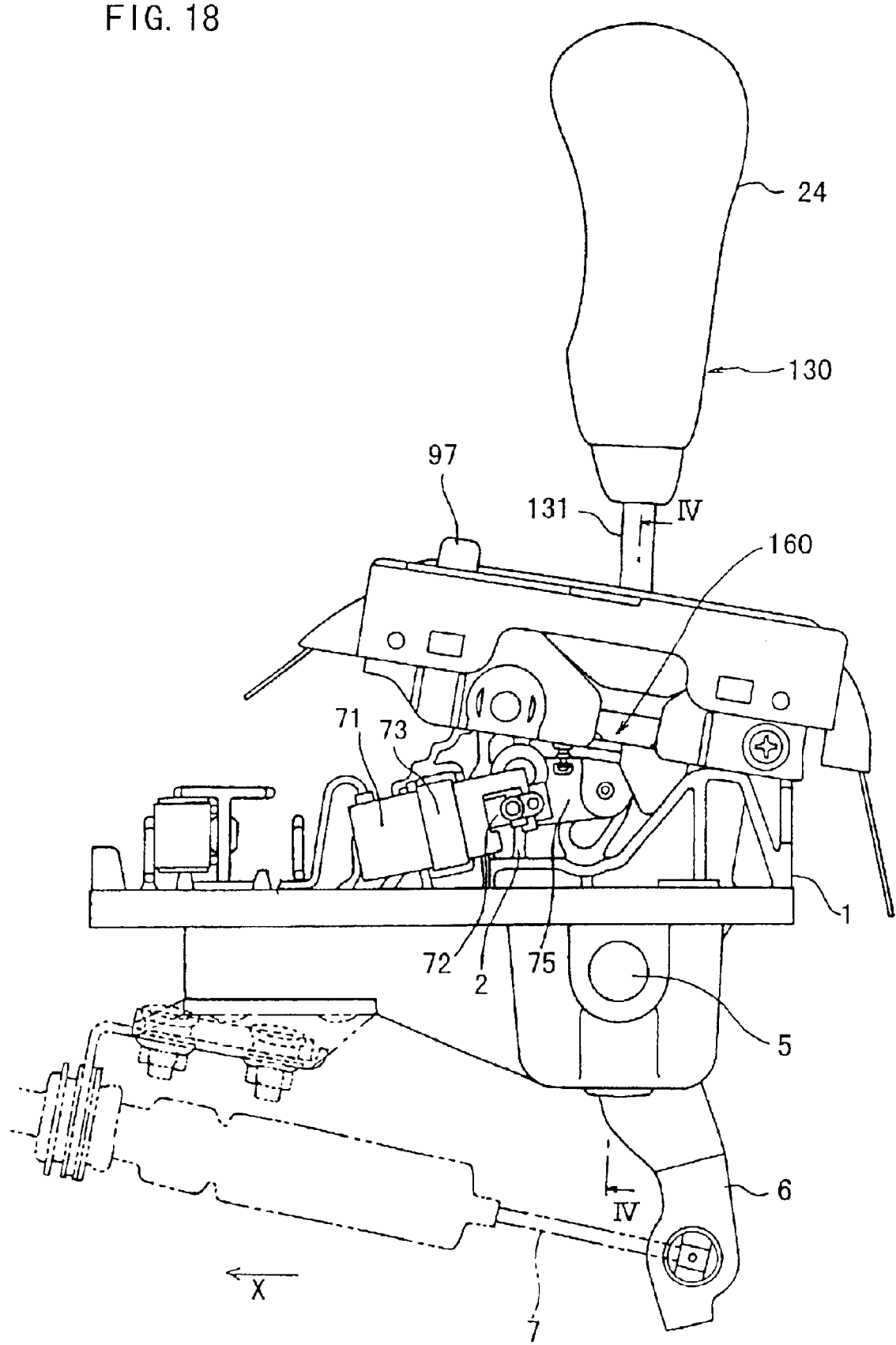
FIG. 18 is the schematic side view of a fourth embodiment of the present invention.
Figure 19:
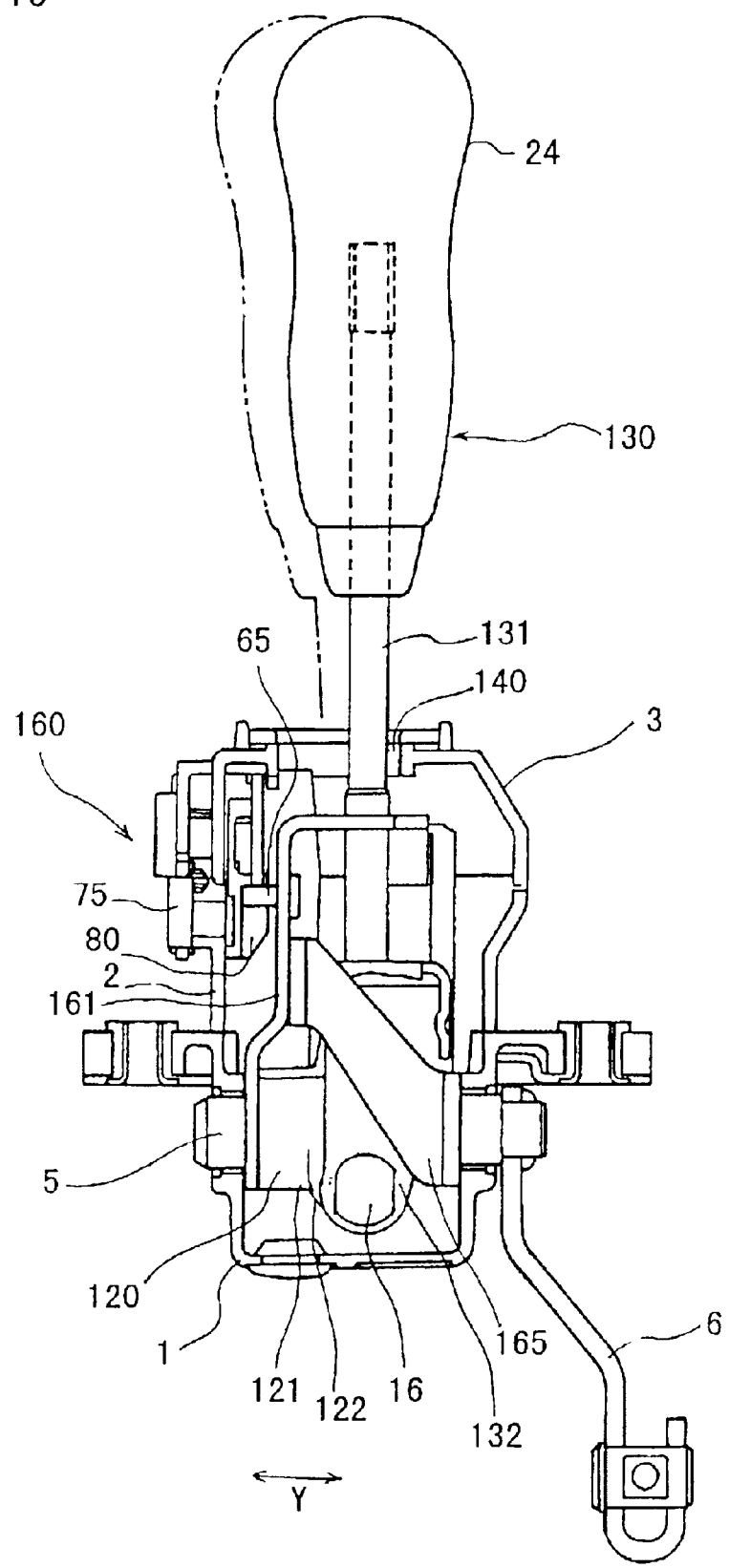
FIG. 19 is a cross sectional view taken along a line IV—IV of FIG. 18.
Figure 20:
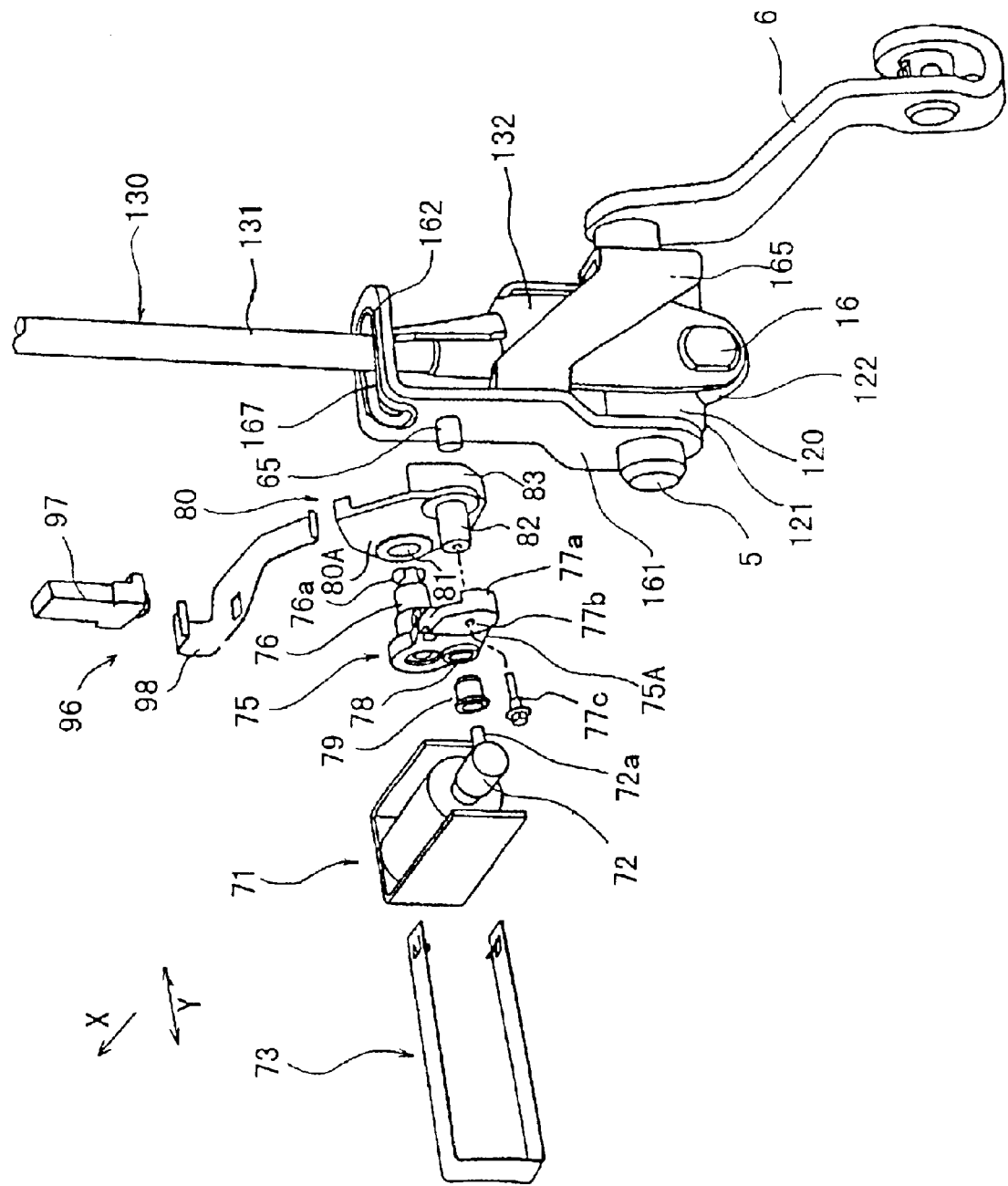
FIG. 20 is an exploded perspective view of the main part of the fourth embodiment.

The fourth embodiment of the present invention is referred in accordance with FIG. 12, 13 and FIGS. 18–21. FIG. 18 is the schematic side view of this embodiment. FIG. 19 is the schematic cross sectional view taken along the line IV—IV of FIG. 18. FIG. 20 is an exploded view in perspective of the main part of the fourth embodiment. In these figures, parts similar to those previously described with the reference to FIGS. 1–12 are denoted by the same numerals. The different parts will be mainly explained below.

An anchor end of a cable mounting arm 6 is secured to one end of a first rotary shaft 5, which is extended substantially in the widthwise direction of the vehicle body and is rotatably supported on a housing 1. A select lever 130 is supported on the first rotary shaft 5 through a joining member 120.

The joining member 120 has a tubular base part 121 secured to the first rotary shaft 5 by a pin (not shown) and a supporting part 122 for a third rotary shaft 16 extending downwardly from the base part 121. A third rotary shaft 16 is below the first rotary shaft 5 and extends substantially perpendicularly to the first rotary shaft 5 and is rotatably fitted into the supporting part 122.

The select lever 130 has, as shown in FIG. 19 and FIG. 20, a lever bracket 132 supported on the joining member 120 through the third rotary shaft 16 and a lever body 131 connected to the upper part of the lever bracket 132. The lower part of the lever bracket 132 is divided into a front part and a rear part, between which the joining member 120 is held. A hollow grip 24 is placed on the upper end of the lever body 131.

Figure 21:
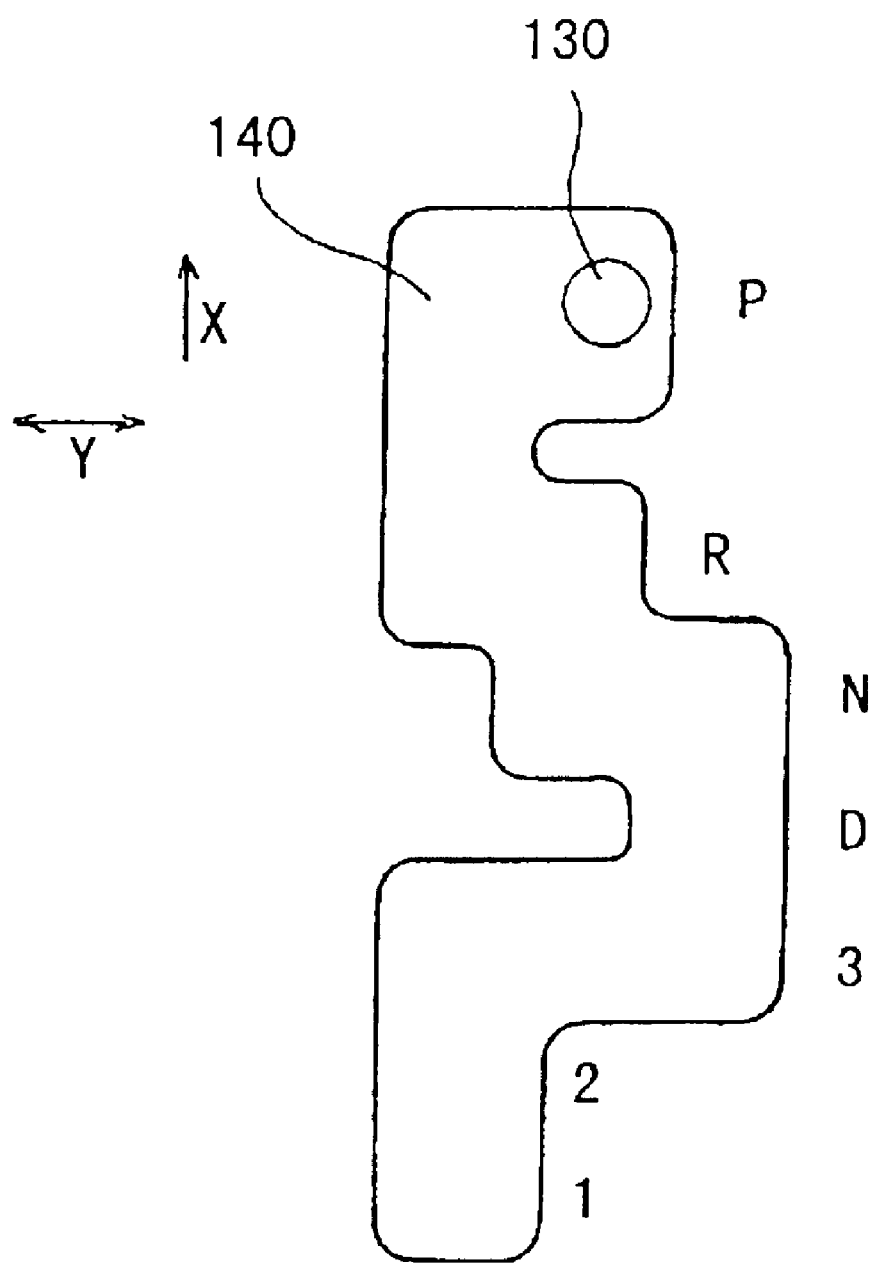
FIG. 21 is a top view of an upper housing.
Figure 22:
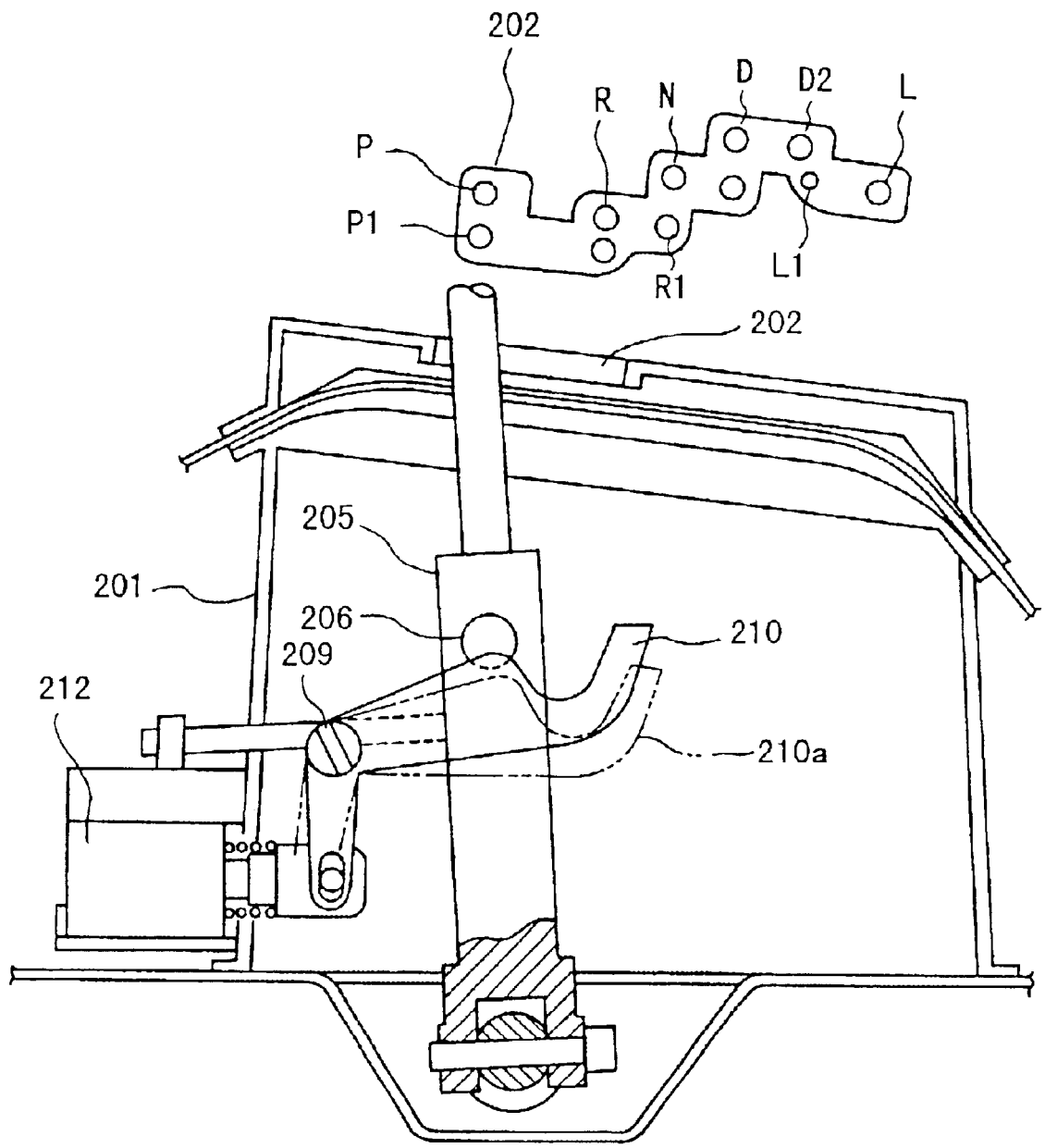
FIG. 22 is a schematic diagram of a control device known in the prior art.

In a top surface of an upper housing 3, there is provided a gate 140 as an opening having a step like configuration, for defining the rotation of the select lever 130 around the first rotary shaft 5 in the lengthwise direction of the vehicle and the rotation of the select lever 130 around the third rotary shaft 16 in the widthwise direction of the vehicle. The gate 140, as shown in FIG. 21 for example, contains a series of, from the front, the P position, the R position, the N position, the D position, the 3-speed position, the 2-speed position and the 1-speed position as the range positions.

The select lever 130 accepted in the gate 140 can change the range position, respectively, from the P position to the R position by moving first in the left seen from the rear of the vehicle, second backwardly, and then in the right; from the R position to the N position by moving backwardly and then in the right; from the N position to the D position by moving backwardly; from the D position to the 3-speed position by moving backwardly; from the 3-speed position to the 2-speed position by moving first in the left and then backwardly; from the 2-speed position to the 1-speed position by moving backwardly. The detent system 40 for maintaining the select lever 130 stepwise is also provided in this embodiment. Further detail is not described because further details are not important to the present invention.

At a side 2 of the lower housing 1, there is provided a shift lock system 160 for prohibiting the selective operation of the selector lever 130.

A shift lock system 160 comprises the lock pin 65 placed on a lock pin bracket 161, an electric solenoid 71, a link member 75, and a lock member 80 as the main components.

The lock pin bracket 161 is supported at a lower part thereof on the first rotary shaft 5, and has a substantially L-shape consisted of a lateral part and an upper part. The lateral part is connected to one end of the base part 121 of the joining member 120 and extended upwardly along the select lever 130. The upper part is formed by bending at the top end of the lateral part and extends substantially in parallel with the first rotary shaft 5. Furthermore, a slit for accepting the select lever 162 and for permitting the movement of the select lever 162 is provided in the upper part.

In this embodiment, a sub bracket 165 is provided for enforcing the lock pin bracket 161. The sub bracket 165 is supported at a bottom end thereof on the first rotary shaft 5, and is connected at a top end thereof to the lateral part of the lock pin bracket 161.

An annular cushion 167 is provided at the periphery of the slit for decreasing looseness of the lever body 131 and the noise caused by the contact with the lever body 131 and the slit 162

Therefore, the select lever 130 can rotate in the widthwise direction of the vehicle by the slit 162 without the interference of the lock pin bracket 161. When the select lever 130 moves forwardly, the lever 130 pushes the front part of the slit 162 forwardly and rotates the lock pin bracket 161 forwardly. When the select lever 130 moves backwardly, the lever 130 pushes the rear part of the slit 162 backwardly and rotates the lock pin bracket 161 backwardly. In other wards, the select lever 130 is arranged to move around the first rotary shaft 5 together with the lock pin bracket 161.

The lock pin 65 is placed in the vicinity of the upper end of the lateral part of the lock pin bracket 161, the lock pin 65 extending substantially in parallel with the first rotary shaft 5 and projecting in the opposite direction with respect to the select lever 130. Therefore, the lock pin 65 moves around the first rotary shaft 5 to have one of the range positions in conjunction with the movement of the select lever 130 to the corresponding range position. On the other hand, the movement of the select lever 130 around the first rotary shaft 5 is prohibited by prohibiting the movement of the lock pin 65 through the lock pin bracket 161. As a result, the selective operation of the select lever 130 is prohibited.

Further description as to the electric solenoid 71 the link member 75, the lock member 80 and the control unit for the shift lock system 95 is omitted, because these parts are almost the same as those used in the first embodiment.

The operation of the above described control device will be explained particularly with reference to FIGS. 12 and 13.

Suppose that the select lever 130 has the P position, the select lever 130 is fixed to the P position by the gate 140 and the detent system, and the cable mounting arm 6 connected to the first rotary shaft 5 also maintains the P position.

Furthermore, the lock member 80 of the shift lock system 160 maintains the P/N lock position, in which the lock part 85 of the lock member 80 is located between the position to be occupied by the lock pin 65 in the P position and the position to be occupied by the pin 65 in the N position.

When the ignition switch 91 is inoperative, or when only the ignition switch 91 is actuated and the brake pedal 92 is not actuated, the electric solenoid 71 is not operated. As the result, the lock member 80 maintains the P/N position. In this case, the selective operation of the select lever 130 to the other range positions is prohibited because the select lever 130 can not move backwardly by the contact of the periphery of the lock pin 65 with the first engaging surface 85a of the lock part 85, though the select lever 130 can move in the left.

When both the ignition switch 91 and the brake pedal 92 are actuated and the vehicle is driven at a slower speed than the predetermined speed, the actuating rod 72 is retracted by a predetermined length by the operation of the electric solenoid 71. Therefore, the lock member 80 moves around the rotary shaft part 76 supported on the side 2 together with the link member 75 integrally connected thereto. As the result, the lock member 80 has the unlock position, in which the contact of the lock pin 65 and the lock part 85 is avoided as shown by the imaginary lines 83a of FIG. 12. Therefore, the selective lever 130 can move backwardly and the selective operations of the select lever 130 to the other range positions are permitted.

During driving forwardly of the vehicle, when the brake pedal 92 is inoperative, the lock member maintains the P/N lock position shown in FIG. 12 by the inoperative electric solenoid 71. In this case, the improper selective operation of the select lever 130 from the N position to the R position is prohibited, because the second engaging surface 85b of the lock part 85 engages with the periphery of the lock pin 65.

When the brake pedal 92 is actuated, the lock member 80 moves to have the unlock position shown by the imaginary lines 83a of FIG. 12 by the operation of the electric solenoid 71. The selective operation of the select lever 130 is permitted because the contact of the periphery of the lock pin 65 with the second engaging surface 85b is avoided.

On the other hand, when the vehicle is driven forwardly at the predetermined speed or more, the electric solenoid 71 is not turned on, even if the brake pedal 92 is actuated. As the result, the lock member 80 maintains the P/N lock position of FIG. 12. In this case, the selective operation of the select lever 130 from the N position to the R position or the P position is prohibited because the second engaging part 85b of the lock part 85 engages with the periphery of the lock pin 65. Therefore, the improper selective operation from the N position to the R position during forward driving of the vehicle is securely prohibited.

For the reverse operation of the vehicle, the selective operation of the select lever 130 from the P position or the N position to R position is carried out when the brake pedal 92 is actuated. When the operation of the brake pedal 92 ceases, the electric solenoid 71 is turned off, and the lock member 80 moves to have the P/N lock position shown by the solid lines. Accompanied with the movement of the lock member 80 to the PIN lock position, the lock member 80 is fixed in the R lock position, in which the third engaging surface 85c of the lock part 85 engages with the periphery of the lock pin 65 in the R position. Therefore, the select lever 130 maintains the R position. At this time, the selective operation of the select lever 130 from the R position to the P position or the N position is prohibited because the lock pin 65 is fixed by the third engaging surface 85c of the lock part 85. When the vehicle is driven at a slower speed than the predetermined speed and the brake pedal 92 is actuated, the electric solenoid 71 is turned on. At this time, the selective operation to the P position or the N position is permitted because the lock member 80 moves to the unlock position.

When the vehicle is driven in the reverse direction at the predetermined speed or more, however, the electric solenoid 71 is not operated, even if the brake pedal 92 is actuated. As the result, the lock member 80 maintains the R lock position shown in the solid lines of FIG. 13. In this position, the selective operation of the select lever 130 to any of the other range positions is prohibited because the third engaging part 85c of the lock part 85 engages with the periphery of the lock pin 65. Therefore, the improper selective operation from the R position to any of the other range positions during driving in the reverse direction of the vehicle is securely prohibited In this gate type transmission control system, like the first embodiment, the lock member 80 is supported on the lower housing 1 so that the lock member 80 can move to have one of the lock position and the unlock position, and the improper selective operation of the select lever 130 is prohibited by bringing the lock part 85 into contact with the periphery of the lock pin 65 placed on the lock pin bracket 161 which moves around together with the select lever 130. Therefore, the stress from the lock pin 65 to the lock member 80 at the improper selective operation affects on the rotary shaft part (the second rotary shaft) 76 and the supporting part thereof (for example, the engaging opening 2a) substantially perpendicularly to the longitudinal direction of the rotary shaft part 76. As the result, the unbalanced stress does not act on the parts. Therefore, the requirement to the stiffness of the parts decreases, and to a simplification of the supporting parts is provided. Furthermore, the wear resistance of the rotary shaft part 76 and the supporting part thereof increases, and the durable shift lock system is provided.

The lock pin 65 can easily rotate together with the select lever 130 by placing the lock pin 65 on the lock pin bracket 161 which moves around the first rotary shaft 5 together with the select lever 130. Therefore, the prohibition of the improper selective operation is performed in optimum conditions.

The embodiment may include the lock members 80 described for the second or the third embodiment in order to obtain the shift lock system having such functions as those in the second or the third embodiment.

The invention being thus described, it will be obvious that the same may be varied in many ways. For an example, contrary to the above embodiments, the second rotary shaft 76 may be integral with the lock member 80 and the link shaft 82 may be integral with the link member 75. Such variations are not to be regarded as a departure from the spirit and scope of the invention, and all such modification as would be understood to one skilled in the art are intended to be included within the scope of the following claims.

What is claimed is:

1. An automatic transmission control device for a vehicle comprising:

a housing for including the transmission control device;

a first rotary shaft supported on the housing and extended in a substantially widthwise direction of a vehicle body;

a lock plate having a guide opening containing range positions for an automatic transition mode including a series of a parking position, a reverse position, a neutral position and a driving position;

a select lever supported on the first rotary shaft and being rotatable for selecting one of the range positions;

a guide pin supported on the select lever, an end of the guide pin for defining a selective operation of the select lever accepted in the guide opening to engage with any of the range positions; and a shift lock system for prohibiting the selective operation of the select lever, the shift lock system comprising:

a lock pin extending substantially in parallel with the first rotary shaft, the lock pin being movable in a lengthwise direction of the vehicle body with response to a rotation of the select lever;

a second rotary shaft supported on the housing and extended substantially in parallel with the first rotary shaft; and a lock member having a lock part supported on the second rotary shaft so as to rotate around the second rotary shaft to have one of a lock position and an unlock position, the lock position for prohibiting the selective operation of the select lever by bringing the lock part into contact with a periphery of the lock pin.

2. The transmission control device as claimed in claim 1, wherein, the shift lock system further comprises:

a lock pin bracket provided with the lock pin for rotating around the first rotary shaft with response to the rotation of the select lever.

3. The transmission control device as claimed in claim 2, wherein, the lock pin bracket further comprises:

a lateral surface extending substantially perpendicularly to a longitudinal direction of the first rotary shaft and facing the select lever; and a pair of opposing surface of a front surface and a rear surface formed by bending at both ends of the lateral surface and by opposing each other with the select lever therebetween; and the lock pin provided on the lateral surface, and the lock pin bracket rotates around the first rotary shaft together with the select lever by the engagement between the select lever and one of the front surface and the rear surface.

4. The transmission control device as claimed in claim 3, wherein, the shift lock system further comprises:
at least a stopper placed on the front surface and the rear surface for defining a first distance between the select lever and the front surface and a second distance between the select lever and the rear surface.

5. The transmission control device as claimed in claim 2, further comprising:
a position for a manual transmission mode set by moving the select lever in the longitudinal direction of the first rotary shaft to disengage the guide pin from the guide opening; and
a selective switch placed within the lock pin bracket for switching between the automatic transmission mode and the manual transmission mode.

6. The transmission control device as claimed in claim 1, wherein:
the lock member is rotatable on the second rotary shaft to have one of the lock position and the unlock position, the lock position for prohibiting selective operations of the select lever from the parking position to the reverse position and from the neutral position to the reverse position by bringing the lock part into contact with the periphery of the lock pin at a position between a position to be occupied by the lock pin in the parking position and a position to be occupied by the lock pin in the neutral position.

7. The transmission control device as claimed in claim 6, wherein:
the lock member has a further lock position for prohibiting the selective operations of the select lever from the reverse position to the other range positions by bringing the lock part into contact with the periphery of the lock pin in the reverse position.

8. The transmission control device as claimed in claim 1, wherein, the lock part comprises:
a first lock part for prohibiting the selective operation from the parking position to the reverse position by contacting the periphery of the lock pin; and
a second lock part extending from the first lock part for prohibiting the selective operation by contacting the periphery of the lock pin in the range positions except the parking position, and the lock member rotates on the second rotary shaft so as to have one of the lock position and the unlock position, the lock position for prohibiting the selective operation from the parking position to the reverse position by bringing the first lock part into contact with the periphery of the lock pin and for prohibiting the selective operations from the parking position to other range positions by bringing the second lock part into contact with the periphery of the lock pin in the range positions except the parking position.

9. The transmission control device as claimed in claim 1, wherein:
the lock member is rotatable on the second rotary shaft so as to have one of the lock position and the unlock position, the lock position for prohibiting the selective operation from the neutral position to the reverse position by bringing the lock part in contact with the periphery of the lock pin.

10. The transmission control device as claimed in claim 1, wherein:
the lock member rotates to have the unlock position when an ignition switch is actuated and a brake pedal is actuated and the vehicle is driven at a slower speed than a predetermined speed.

11. The transmission control device claimed in claim 1, wherein:
the lock member maintains the lock position at a predetermined driving speed or more regardless of the brake operation.

12. The transmission control device as claimed in claim 1, wherein, the shift lock system further comprises:
a link member linked to the lock member by the second rotary shaft for facing the lock member by interposing the housing therebetween; and
a driving means with an actuating rod for making a reciprocating motion, an end of the actuating rod connected to the link member, and
the lock member rotates on the second rotary shaft so as to have one of the lock position and the unlock position by a rotation of the second rotary shaft.

13. The transmission control device as claimed in claim 12, wherein:
the driving means is an electric solenoid,
the lock member rotates from the lock position to the unlock position through the actuating rod and the link member when the electric solenoid is turned on, and
the lock member maintains the lock position when the electric solenoid is turned off.

14. The transmission control device as claimed in claim 12, wherein:
the link member is further linked to the lock member by a link pin spaced from the second rotary shaft.

15. The transmission control device as claimed in claim 14, wherein:
the housing has an opening of an arc shape for receiving the link pin, the second rotary shaft is at a center of the arc, and
the link pin moves within the opening accompanied by the rotation of the lock member between the lock position and the unlock position.

16. The transmission control device as claimed in claim 14, wherein:
the second rotary shaft is integral with one of the lock member and the link member, and
the link pin is integral with one of the lock member and the link member.

17. The transmission control device as claimed in claim 12, wherein:
the second rotary shaft is integral with one of the lock member and the link member,
a link opening is provided in the other of the lock member and the link member for receiving the second rotary shaft,
the shift lock system has an engagement means for engaging with both an end of the second rotary shaft and the link opening, and
the engagement means engages with both the end of the second rotary shaft and the link opening by rotating after inserting the end of the second rotary shaft into the link opening.

18. An automatic transmission control device for a vehicle comprising:
a housing for including the transmission control device;
a first rotary shaft supported on the housing and extended in a substantially widthwise direction of a vehicle body;
a third rotary shaft extended substantially perpendicularly to a longitudinal direction of the first rotary shaft;
a select lever being rotatable around both the first rotary shaft and the third rotary shaft for selecting one of range positions for an automatic transmission mode;

a gate provided in the housing containing the range positions including a series of a parking position, a reverse position, a neutral position and a driving position for defining a selective operation of the select lever; and a shift lock system for prohibiting the selective operation of the select lever, the shift lock system comprising:

a lock pin extending substantially in parallel with the first rotary shaft, the lock pin being movable in a lengthwise direction of the vehicle body with response to a rotation of the select lever;

a second rotary shaft supported on the housing and extended substantially in parallel with the first rotary shaft; and a lock member with a base part having substantially semidisc shape and with a lock part configured along an edge of the base part and extending substantially in parallel with the second rotary shaft, the lock member supported on the second rotary shaft so as to rotate around the second rotary shaft to have one of a lock position and an unlock position, the lock position for prohibiting the selective operation of the select lever by bringing the lock part into contact with a periphery of the lock pin.

19. The transmission control device as claimed in claim 18, wherein, the shift lock system further comprises:

a lock pin bracket provided with the lock pin for rotating around the first rotary shaft with response to the rotation of the select lever.

20. The transmission control device as claimed in claim 19, wherein, the lock pin bracket further comprises:

a lateral surface extending substantially perpendicularly to the longitudinal direction of the first rotary shaft and facing the select lever;

a top surface formed by bending at a top end of the lateral surface;

the lock pin provided on the lateral face; and a slit provided in the top surface extending in the longitudinal direction of the first rotary shaft for accepting the select lever therein and for permitting the rotation of the select lever in the longitudinal direction of the first rotary shaft.

21. The transmission control device as claimed in claim 20, wherein, the shift lock system further comprises:

at least a cushion placed in the slit at a periphery of the slit for defining a first distance between the select lever and a front edge of the slit and a second distance between the select lever and a rear edge of the slit.

22. The transmission control device as claimed in claim 18, wherein:

the lock member is rotatable on the second rotary shaft to have one of the lock position and the unlock position, the lock position for prohibiting selective operations of the select lever from the parking position to the reverse position and from the neutral position to the reverse position by bringing the lock part into contact with the periphery of the lock pin at a position between a position to be occupied by the lock pin in the parking position and a position to be occupied by the lock pin in the neutral position.

23. The transmission control device as claimed in claim 22, wherein:

the lock member has a further lock position for prohibiting the selective operations of the select lever from the reverse position to the other range positions by bringing the lock part into contact with the periphery of the lock pin in the reverse position.

24. The transmission control device as claimed in claim 18, wherein, the lock part comprises:

a first lock part for prohibiting the selective operation from the parking position to the reverse position by contacting the periphery of the lock pin; and a second lock part extending from the first lock part for prohibiting the selective operation by contacting the periphery of the lock pin in the range positions except the parking position, and the lock member rotates on the second rotary shaft so as to have one of the lock position and the unlock position, the lock position for prohibiting the selective operation from the parking position to the reverse position by bringing the first lock part into contact with the periphery of the lock pin and for prohibiting the selective operations from the parking position to other range positions by bringing the second lock part into contact with the periphery of the lock pin in the range positions except the parking position.

25. The transmission control device as claimed in claim 18, wherein:

the lock member is rotatable on the second rotary shaft so as to have one of the lock position and the unlock position, the lock position for prohibiting the selective operation from the neutral position to the reverse position by bringing the lock part in contact with the periphery of the lock pin.

26. The transmission control device as claimed in claim 18, wherein:

the lock member rotates to have the unlock position when an ignition switch is actuated and a brake pedal is actuated and the vehicle is driven at a slower speed than a predetermined speed.

27. The transmission control device claimed in claim 18, wherein:

the lock member maintains the lock position at a predetermined driving speed or more regardless of the brake operation.

28. The transmission control device as claimed in claim 18, wherein, the shift lock system further comprises:

a link member linked to the lock member by the second rotary shaft for facing the lock member by interposing the housing therebetween; and a driving means with an actuating rod for making a reciprocating motion, an end of the actuating rod connected to the link member, and the lock member rotates on the second rotary shaft so as to have one of the lock position and the unlock position by a rotation of the second rotary shaft.

29. The transmission control device as claimed in claim 28, wherein:

the driving means is an electric solenoid, the lock member rotates from the lock position to the unlock position through the actuating rod and the link member when the electric solenoid is turned on, and the lock member maintains the lock position when the electric solenoid is turned off.

30. The transmission control device as claimed in claim 28, wherein:

the link member is further linked to the lock member by a link pin spaced from the second rotary shaft.

31. The transmission control device as claimed in claim 30, wherein:

the housing has an opening of an arc shape for receiving the link pin, the second rotary shaft is at a center of the arc, and the link pin moves within the opening accompanied by the rotation of the lock member between the lock position and the unlock position.

32. The transmission control device as claimed in claim 30, wherein:
the second rotary shaft is integral with one of the lock member and the link member, and
the link pin is integral with one of the lock member and the link member.

33. The transmission control device as claimed in claim 30, wherein:
the second rotary shaft is integral with one of the lock member and the link member,
a link opening is provided in the other of the lock member and the link member for receiving the second rotary shaft,
the shift lock system has an engagement means for engaging with both an end of the second rotary shaft and the link opening, and
the engagement means engages with both the end of the second rotary shaft and the link opening by rotating after inserting the end of the second rotary shaft into the link opening.

34. An automatic transmission control device for a vehicle comprising:
a housing for including the transmission control device;
a first rotary shaft supported on the housing and extended in a substantially widthwise direction of a vehicle body;
a third rotary shaft extended substantially perpendicularly to a longitudinal direction of the first rotary shaft;
a select lever being rotatable around both the first rotary shaft and the third rotary shaft for selecting one of range positions for an automatic transmission mode;
a gate provided in the housing containing the range positions including a series of a parking position, a reverse position, a neutral position and a driving position for defining a selective operation of the select lever; and
a shift lock system for prohibiting the selective operation of the select lever, the shift lock system comprising:
a lock pin extending substantially in parallel with the first rotary shaft, the lock pin being movable in a lengthwise direction of the vehicle body with response to a rotation of the select lever
second rotary shaft supported on the housing and extended substantially in parallel with the first rotary shaft; and
a lock member which is rotatably supported on said second rotary shaft so as to rotate around said secondary rotary shaft to assume one of a lock position and an unlock position, and said lock member, which is rotatable about said second rotary shaft, being dimensioned and arranged to prohibit a plurality of improper selective operations of the select lever by bringing a lock part of said secondary rotary shaft into contact with a periphery of the lock pin.

* * * * *